US012809834B2

(12) United States Patent
Lasky et al.

(10) Patent No.: US 12,809,834 B2
(45) Date of Patent: Nov. 24, 2026

(54) DATA GRAPH CHANGE DETECTION USING EVENT EMITTERS

(71) Applicant: Twilio Inc., San Francisco, CA (US)

(72) Inventors: Daniel Joseph Lasky, Chattahoochee Hills, GA (US); Eric Rogner, San Francisco, CA (US); Max Luster, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/910,927

(22) Filed: Oct. 9, 2024

(65) Prior Publication Data

US 2025/0370968 A1 Dec. 4, 2025

Related U.S. Application Data

(63) Continuation-in-part of application No. 18/733,420, filed on Jun. 4, 2024.

(51) Int. Cl.

| | |
|---|---|
| ***G06F 16/215*** | (2019.01) |
| ***G06F 16/23*** | (2019.01) |
| ***G06F 16/25*** | (2019.01) |
| ***G06F 16/28*** | (2019.01) |
| ***G06Q 10/063*** | (2023.01) |

(52) U.S. Cl.

CPC .......... *G06F 16/215* (2019.01); *G06F 16/283* (2019.01)

(58) Field of Classification Search

USPC .......................................................... 707/692

See application file for complete search history.

(56) References Cited

U.S. PATENT DOCUMENTS

| | | | |
|---|---|---|---|
| 10,157,221 B2 | 12/2018 | Mac An Tsaoir et al. | |
| 2003/0172368 A1 | 9/2003 | Alumbaugh et al. | |
| 2009/0171730 A1 * | 7/2009 | Bobak .................... | G06Q 10/00 705/80 |
| 2011/0219044 A1 | 9/2011 | Peukert | |
| 2017/0168748 A1 * | 6/2017 | Barsness ............... | G06F 3/0481 |

(Continued)

FOREIGN PATENT DOCUMENTS

| | | |
|---|---|---|
| WO | 2023117630 | 6/2023 |

OTHER PUBLICATIONS

Xiongfeng Yan; A graph convolutional neural network for classification of building patterns using spatial vector data; Elsevier; 2019; pp. 259-273 (Year: 2019).*

(Continued)

*Primary Examiner* — Marc S Somers
*Assistant Examiner* — Jermaine A Mincey
(74) *Attorney, Agent, or Firm* — Schwegman Lundberg & Woessner, P.A.

(57) ABSTRACT

Methods and systems for minimizing disruption when changes to a data graph are detected are disclosed. A data graph is continuously monitored for one or more changes to entities or relationships within a data warehouse. Based on a detection of the one or more changes, each of the one or more changes is categorized as either breaking or non-breaking based on one or more criteria pertaining to stability or data integrity. One or more modifications to the data graph or the data warehouse are executed to accommodate the one or more identified changes, wherein the one or more modifications are executed using an algorithm optimized to minimize disruption or enhance data processing efficiency.

18 Claims, 21 Drawing Sheets

(56) References Cited

U.S. PATENT DOCUMENTS

| | | | | |
|---|---|---|---|---|
| 2022/0365525 | A1* | 11/2022 | Minisankar | G06N 20/00 |
| 2023/0028620 | A1* | 1/2023 | Bowman | G06F 16/958 |
| 2025/0371568 | A1 | 12/2025 | Lasky et al. | |

OTHER PUBLICATIONS

"U.S. Appl. No. 18/733,420, Non Final Office Action mailed Oct. 2, 2025", 19 pgs.

"U.S. Appl. No. 18/733,420, Response filed Jan. 2, 2026 to Non Final Office Action mailed Oct. 2, 2025", 17 pgs.

* cited by examiner

```
data graph {
    version = "v0.0.4"

    Profile {
        Profile_folder = "segment" #folder or schema location for profile tabels
        materialization = "dbt" #one of 'none' 'dbt' 'segment' only none for pilot

        //canonical id is missing (reducted flexibility here)
        relationship "Account" {
            related entity = "account"
            external_id {
                type = "email"
                join key = "email"
            }

            relationship "Carts" {
                related entity = "cart"

                //the references in the join on should be ENTITY name keys
                join on = "cart.account_id = account.id"

                relationship "Products in Cart"
                    related entity = ["product"]
                    junction_table {
                        primary key = "id"
                        table ref = "cust.cart.product"
                        left join on = "cart.id = cart_id"

//note that schema.table is implied within the cart_id key and user doesnot
need to provide
                        right_joint_on = "product_id = product.sku"
```

FIG. 4A

```
            }
        }
    }

    relationship "Wish List" {
        related_entity = "wish_list"
        join_on = "account.id = wish_list.id"
        relationship "Products in Wish List" {
            related_entity = "product"
            junction_table {
                table_ref = "cust.list_product"
                left_join_on = "wish_list.id = list_id"
                right_join_on = "product_id = product.sku"
            }
        }
    }
}

relationship "Subscriptions" {
    related_entity = "membership_subscription"
    trait {
        name = "account_id"
        join_key = "id"
    }
}

relationship "Loyalty Membership" {
    related_entity = "loyalty_program"
    external_id {
        type = "phone"
        join_key = "id"
    }
}

}
```

FIG. 4B

```
  entity "account" {
    table_ref = "cust.account"
    primary_key = "id"
    enrichment_enabled = true
  }

  entity "cart" {
    table_ref = "cust.cart"
    primary_key = "id"

  }

  entity "wish_list" {
    table_ref = "cust.wish_list"
    primary_key = "id"

  }

  entity "product" {
    table_ref = "prod.product_skus"
    primary_key = "sku"
    enrichment_enabled = true
  }

  entity "membership_subscription" {
    table_ref = "cust.subscriptions"
    primary_key = "id"
  }

  entity "loyalty_program" {
    table_ref = "cust.loyalty"
    primary_key = "id"
  }
}
```

FIG. 4C

Entity_group_poc current

| | |
|---|---|
| id | varbinary (255) |
| name | varbinary (128) |
| description | varbinary (255) |
| workspace_id | varbinary (24) |
| Space_id | varbinary (32) |
| Source_id | varbinary (64) |
| Created_at | timestamp |
| Updated_at | timestamp |

→

Entity_group_proposed

| | |
|---|---|
| id | varbinary (255) |
| workspace_id | varbinary (24) |
| Space_id | varbinary (32) |
| Source_id | varbinary (64) |
| name | varbinary (128) |
| description | varbinary (255) |
| profile_folder | varbinary (255) |
| materialization | enum("noneldbtsegment") |
| revision_sha | varbinary(64) |
| Created_at | timestamp |
| updated_at | timestamp |

FIG. 5

Entity_group_poc current

| | |
|---|---|
| id | varbinary (255) |
| entity_group_id | varbinary (255) |
| name | varbinary (128) |
| description | varbinary (255) |
| table_name | varbinary (128) |
| table_schema | ison |
| table_schema_ version | varbinary (255) |
| table_schema_ updated_at | timestamp |
| created_at | timestamp |
| updated_at | timestamp |
| folder_name | varbinary (128) |
| model_id | varchar (64) |

Entity_group_proposed

| | |
|---|---|
| id | varbinary (255) |
| entity_group_id | varbinary (255) |
| name | varbinary (128) |
| description | varbinary (255) |
| slug | varbinary (128) |
| table_name | varbinary (128) |
| folder_name | varbinary (128) |
| primary_key | varbinary (512) |
| model_id | varbinary (64) |
| type | enum("entiylevent") |
| created_at | timestamp |
| updated_at | timestamp |

FIG. 6

| Column Name | Type | Notes |
|---|---|---|
| id | varbinary (255) | |
| name | varbinary (128) | |
| slug | varbinary (128) | Slug to be computed from submitted name (slugify!) |
| type | enum("profile_entity"\|"entity"\|"junction") | Type will be used to determine the filed expectations in the option table. |
| parent_entity_id | varbinary (255) | |
| parent_entity_id | varbinary (255) | |
| entity_group_id | varbinary (255) | |
| created_at | timestamp | |
| updated_at | timestamp | |

| Column Name | Type | Notes |
|---|---|---|
| id | varbinary (255) | |
| relationship_id | varbinary (255) | |
| name | varbinary (128) | Name value is basically a flexible bundle of config. |
| value | varbinary (128) | |
| created_at | timestamp | |
| updated_at | timestamp | |

FIG. 7 getProfileEntity(entity_group_id : string) : Entity

*Given the entity group id (holder for entities, 1:1 with space) return all 'top level' entities*

Example Response

```
{
id:"profile",
folderName: "segment",
materialization: "none", //none,dbt,segment
graphRevision:"<sha>",
 relationships: [{
type:"<KSUID>", //relationship id
 type:"profile_entity",
 name:"Accounts",
 relationshipSlug:"account",
 strategy: "id_resolution", //id_res or trait
 strategyType: "email", //email, phone, user_id
 joinKey: "email", //key on account table to join
 entitySlug: "<entitySlug>"
 entityTable:"cust.account"
},{
id:"<KSUID>",
type:"profile_entity",
name:"Loyalty",
 relationshipSlug: "loyalty",
 strategy: "id_resolution",
 strategyType: "phone",
 joinKey: "phone",
 entitySlug: "<entitySlug>", //slug of child entity if any (useful for next call)
 entityTable: "cust.loyalty" //path to child table (saves compute a call)
```

B

FIG. 8A

B

```
},{
id:"<KSUID>",
type:"profile_entity",
name:"Subscriptions",
relationshipSlug: "subscriptions",
        strategy: "trait",
        traitName: "subscription_id",
       joinKey: "id",
entitySlug: "<entitySlug>",
entityTable:"cust.subscriptions"
}]
}
```

FIG 8A (CONTINUED)

```
getRelatedEntitiesBySlugs(entity_slug: []string) : {[entity_slug]: …Entity }

Given Slug for cart

{[<KSUID>]: {
id:"<KSUID>"
type:"entity"
name:"Cart",
slug:"cart",
     primaryKey: "id",
 folderName: "cust",
 tableName: "cart",
 relationships: [{
name:"Products in Cart"
 relationshipSlug: "products-in-cart",
type:"junction",
 joinTable: "cust.products_cart",
 joinTablePrimaryKey: "cart_id",
 //childId: "<KSUID>", //entity id of products
 childTable: "cust.products",
 childSlug: "<entitySlug>"
 joinKeys: {
 parentKey:"id"
 leftKey:"cart_id"
 rightKey:"product_id"
 childKey:"sku"
 }
 }]
}
```

FIG. 8B

Given Slug for account

```
{[<KSUID>]: {
id:"<KSUID>"
type:"entity",
name:"Accounts",
 slug:"accounts",
    primaryKey: "id",
 folderName: "cust",
 tableName: "account",
 relationships:[{
id:"<KSUID>",
type:"entity",
name:"Cart",
 relationshipSlug: "cart",
 joinKey: "id", //key on account table to join
 entityKey: "account_id", //key on cart table to join
 entityTable: "cust.cart",
 entitySlug: "<entitySlug>"
 },{
id:"<KSUID>",
type:"entity",
name:"Wishlist",
 relationshipSlug: "wishlist",
 joinKey: "id",
 entityKey: "account_id",
 entityTable: "cust.wishlist",
 entitySlug: "<entitySlug>"
 }]
}}
```

FIG. 8C

Data Graph/ advanced breaking change handle method

DATA GRAPH CHANGE DETECTION USING EVENT EMITTERS

TECHNICAL FIELD

The disclosed subject matter relates generally to the technical field of system stability and data integrity and, in one specific embodiment, to methods and systems monitoring and managing changes within a data graph in a data warehouse environment to ensure system stability and data integrity.

BACKGROUND

In the realm of data warehousing, businesses and organizations have long sought efficient ways to organize, access, and analyze large volumes of data. Data warehouses serve as centralized repositories where data from various sources is stored and managed. Within these warehouses, data is often divided into tables and schemas that represent different entities and their attributes, such as customer profiles, transactions, products, and more.

BRIEF DESCRIPTION OF THE DRAWINGS

Some embodiments are illustrated by way of example and not limitation in the figures of the accompanying drawings.

FIG. 4A presents a portion of a data graph configuration language (e.g., HCL) script, which defines the structure and relationships of a data graph for a data warehouse.

FIG. 4B continues from FIG. 4A, showing additional relationships within the data graph configuration.

FIG. 4C concludes the data graph configuration language script from FIGS. 4A and 4B, detailing the entity definitions.

FIG. 5 is a table diagram illustrating an example structure of an Entity Group table, which organizes entity groups within the data graph system.

FIG. 6 is a table diagram illustrating an example structure of an Entities table, which details individual entities within the data graph system.

FIG. 7 is a table diagram illustrating an example structure of an Entities Relationship table and an Entities Relationship Options table, which capture the relationships between entities and their configurable options.

FIG. 8A is an example API response for a getProfileEntity request, showing the structure and content of the response data.

FIG. 8B is an example API response for a getRelatedEntitiesBySlugs request, illustrating how entities related to a given slug are retrieved and presented.

FIG. 8C is a continuation of the example API responses from FIG. 8B, providing additional details on the retrieval of related entities by slugs.

DETAILED DESCRIPTION

Figure 1:
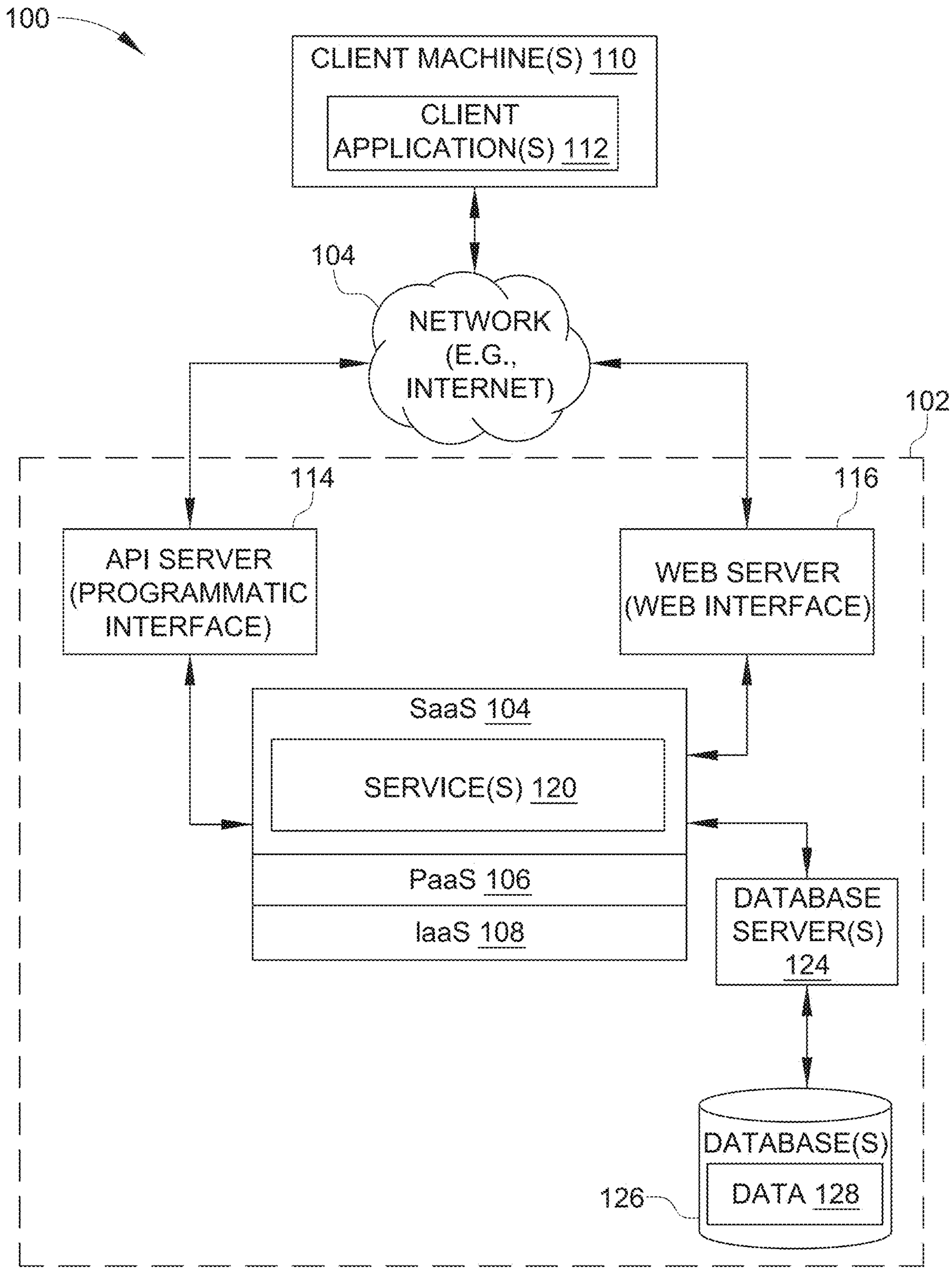
FIG. 1 is a schematic diagram illustrating an example of a cloud-based system architecture within which the present invention may be implemented.

In the following description, for purposes of explanation, numerous specific details are set forth in order to provide an understanding of various embodiments of the present subject matter. It will be evident, however, to those skilled in the art that various embodiments may be practiced without these specific details.

In example embodiments, a data warehouse is a centralized repository designed for query and analysis, which aggregates data from multiple sources and organizes it into a structured format. A data warehouse may be optimized for read access, providing quick retrieval of large volumes of data. It may be structured in a way that makes it suitable for complex queries, reporting, and data analysis, often using a schema-on-write approach where the data schema is defined before data is written into the warehouse.

A data warehouse may differ from a traditional database in that a data warehouse may be specifically structured for analysis and query performance rather than transaction processing. While a database is typically used for the day-to-day operation of applications, handling CRUD (Create, Read, Update, Delete) operations, a data warehouse may be designed for batch processing and not typically used for real-time transactional workloads. Databases may be normalized to reduce redundancy, whereas data warehouses may be denormalized to optimize for query speed and simplicity. Additionally, a data warehouse may store data by columns rather than by rows (e.g., making it more suitable for analytical query processing).

A data warehouse may also differ from a data lake, which is a storage repository that holds a vast amount of raw data in its native format until it is needed. While a data warehouse stores data in a structured format, a data lake may use a schema-on-read approach, meaning that the data structure and requirements are not defined until the data is queried. Data lakes are designed to handle a wide variety of data types, including structured, semi-structured, and unstructured data, and are particularly suited for big data and real-time analytics scenarios.

In example embodiments, a data warehouse is a specialized type of database optimized for analysis and reporting, offering a structured environment that is distinct from the more operational focus of traditional databases and the more flexible, raw data-oriented nature of data lakes.

Technical problems in data warehousing may include one or more of the following:

Complex data relationship mapping. In traditional data warehousing, the mapping of data relationships is often manually coded, leading to complex and rigid queries (e.g., SQL queries) that are difficult to adapt when data schemas evolve.

Lack of semantic understanding. Existing systems may lack the capability to interpret the semantic meaning of data relationships, which may be important for various applications, including data analysis and audience grouping.

Manual schema evolution management. Data warehouses may require frequent updates to their schemas, which are typically managed manually. This process is prone to human error and can result in inconsistencies and downtime.

Inflexible audience building. Building audiences for marketing campaigns often relies on predefined data models that lack the flexibility to accommodate unique or complex customer traits and behaviors.

Technical Barrier for Non-Technical Users: Non-technical users face significant challenges in interacting with the data warehouse due to the technical nature of query and schema design, leading to reliance on data engineering teams.

The disclosed methods and systems provide various technical solutions, including the following:

Data Graph Specification: The described technology introduces a data graph specification that allows for the definition of data entities and their relationships using a configuration language. This approach abstracts the complexity of a typical language (e.g., SQL) and provides a more intuitive method for mapping data relationships.

Semantic Meaning Interpretation: The described technology incorporates a system for providing semantic meaning to data relationships, enabling more accurate and relevant data analysis and audience division and/or grouping.

Automated Schema Evolution Tracking: The described technology includes a warehouse discovery service that automatically tracks and validates changes in the data warehouse against the data graph specification, ensuring consistency and reducing manual oversight. In example embodiments, the system can effectively predict failure of query execution due to inconsistencies prior to query runtime.

Dynamic Audience Building: By leveraging the data graph, the described technology enables dynamic audience building, allowing users to create customer groupings based on a wide range of attributes and relationships without the need for complex queries. In example embodiments, the audience building can be performed by less technical users who do not need to author such complex queries.

User-Friendly Interface and API: The described technology offers a user-friendly interface, including a code editor and graphical visualization, as well as a public API for programmatic access. This significantly lowers the barrier for non-technical users to interact with the data warehouse.

Methods and systems for providing semantic meaning to data items in a data warehouse are disclosed. A data graph specification written in a configuration language is received. The data graph specification defines a plurality of data entities and relationships between the data entities. The received data graph specification is parsed to generate an object representation of the data graph. A schema of a data warehouse is validated against the object representation of the data graph. One or more queries based on the object representation of the data graph.

The operations herein may provide semantic meaning to data items in a data warehouse through one or more the following operations.

Receiving a data graph specification. The data graph specification is a structured representation that defines data entities and their interrelationships. By specifying these relationships in a configuration language, the method introduces a layer of abstraction that goes beyond the physical structure of the data warehouse. This specification captures the semantic context of how data entities relate to each other, which can help for understanding the meaning behind the data.

Parsing the data graph specification. Parsing the specification to generate an object representation translates the abstract definitions into a concrete, machine-understandable format. This operation may help for interpreting the semantics of the data graph, as it converts the human-readable configuration into a form that can be processed by computer systems.

Validating the schema of a data warehouse. By validating the actual schema against the object representation of the data graph, it may be ensured that the semantic relationships defined in the data graph are accurately reflected in the data warehouse. This validation operation is where the semantic meaning is enforced and checked for consistency with the actual data structure. In example embodiments, this validation ensures successful query execution.

Generating queries based on the data graph: The generation of queries based on the object representation of the data graph allows for the practical application of the semantic relationships. These queries may retrieve, manipulate, and analyze data in ways that are meaningful for the business or application, such as identifying customer groupings, product categories, or transaction patterns.

In other words, various described embodiments may provide semantic meaning by defining a logical model (the data graph) that represents how data entities are semantically related within a data warehouse. This model is then used to guide the generation of queries and other data operations, ensuring that the interactions with the data warehouse are semantically consistent and meaningful.

In comparison to alternative methods, such as those that use inferred models for understanding and/or relating tables within a data warehouse, the data graph approach described herein has several advantages. Firstly, the data graph provides a more accurate representation of the warehouse's logical model, as it is explicitly defined by the user. Inferring from metadata can lead to inaccuracies. Secondly, the data graph approach allows for the modeling of more complex relationships, such as composite joins or circular references, which may not be possible with inferred models. Thirdly, the data graph enables user-friendly naming for tables and relationships, significantly improving the accessibility of the system for non-technical users, such as marketers, who can build audiences and perform data operations without deep technical knowledge. Fourthly, the data graph approach can potentially integrate artificial intelligence (AI) to automate the generation of the data graph itself from the warehouse metadata, simplifying setup and adoption for customers by reducing the complexity involved in configuring the data graph manually.

In example embodiments, AI may be used to enhance authoring and/or generate data graphs. For example, AI could be used to enhance the authoring process of the data graph specification. AI may be integrated with the user interface's code editor to provide features like auto-completion for the structure of the warehouse, which would simplify the authoring process for users by suggesting relevant tables and fields as they define the data graph. As another example, AI could be used to generate the data graph itself from the metadata of the warehouse. By providing a sufficiently detailed prompt, AI could analyze the warehouse's metadata and automatically construct a logical model that represents the relationships between tables. This would greatly ease customer adoption by reducing the complexity of setting up the data graph, as it would minimize the need for manual configuration and possibly eventually lead to a "magic button" solution that automates much of the initial setup process.

Methods and systems for minimizing disruption when changes to a data graph are detected are disclosed. A data graph is continuously monitored for one or more changes to entities or relationships within a data warehouse. Based on a detection of the one or more changes, each of the one or more changes is categorized as either breaking or non-breaking based on one or more criteria pertaining to stability or data integrity. One or more modifications to the data graph or the data warehouse are executed to accommodate the one or more identified changes, wherein the one or more modifications are executed using an algorithm optimized to minimize disruption or enhance data processing efficiency.

FIG. 1 is a network diagram depicting a system 100 within which various example embodiments may be deployed.

A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). The figure illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications (e.g., service(s)) 120 are shown in the figure to form part of the networked system 102, in alternative embodiments, the applications 120 may form part of a service that is separate and distinct from the networked system 102.

Further, while the system 100 shown in the figure employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although the figure depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server application(s) and/or service(s) 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In example embodiments, various data items are stored in the database(s) 126, such as the system's data items 128. In example embodiments, the system's data items may be any of the data items described herein.

Navigation of the networked system 102 may be facilitated by one or more navigation applications. For example, a search application (as an example of a navigation application) may enable keyword searches of data items included in the one or more database(s) 126 associated with the networked system 102. A client application may allow users to access the system's data 128 (e.g., via one or more client applications). Various other navigation applications may be provided to supplement the search and browsing applications.

Figure 2:
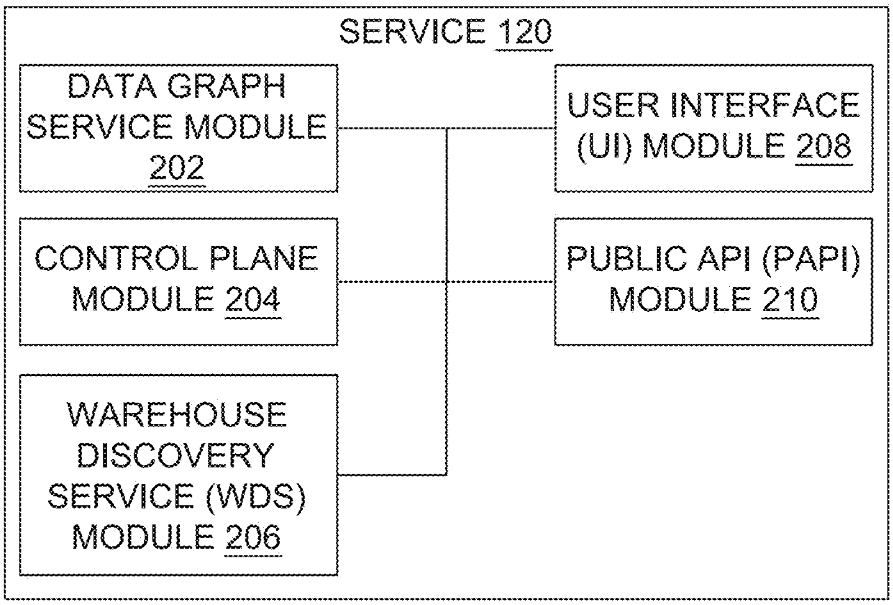
FIG. 2 is a block diagram depicting the primary modules of the service(s) within the cloud-based system of FIG. 1.

FIG. 2 is a block diagram illustrating example modules 200 of the service(s) 120 of FIG. 1.

Figure 3:
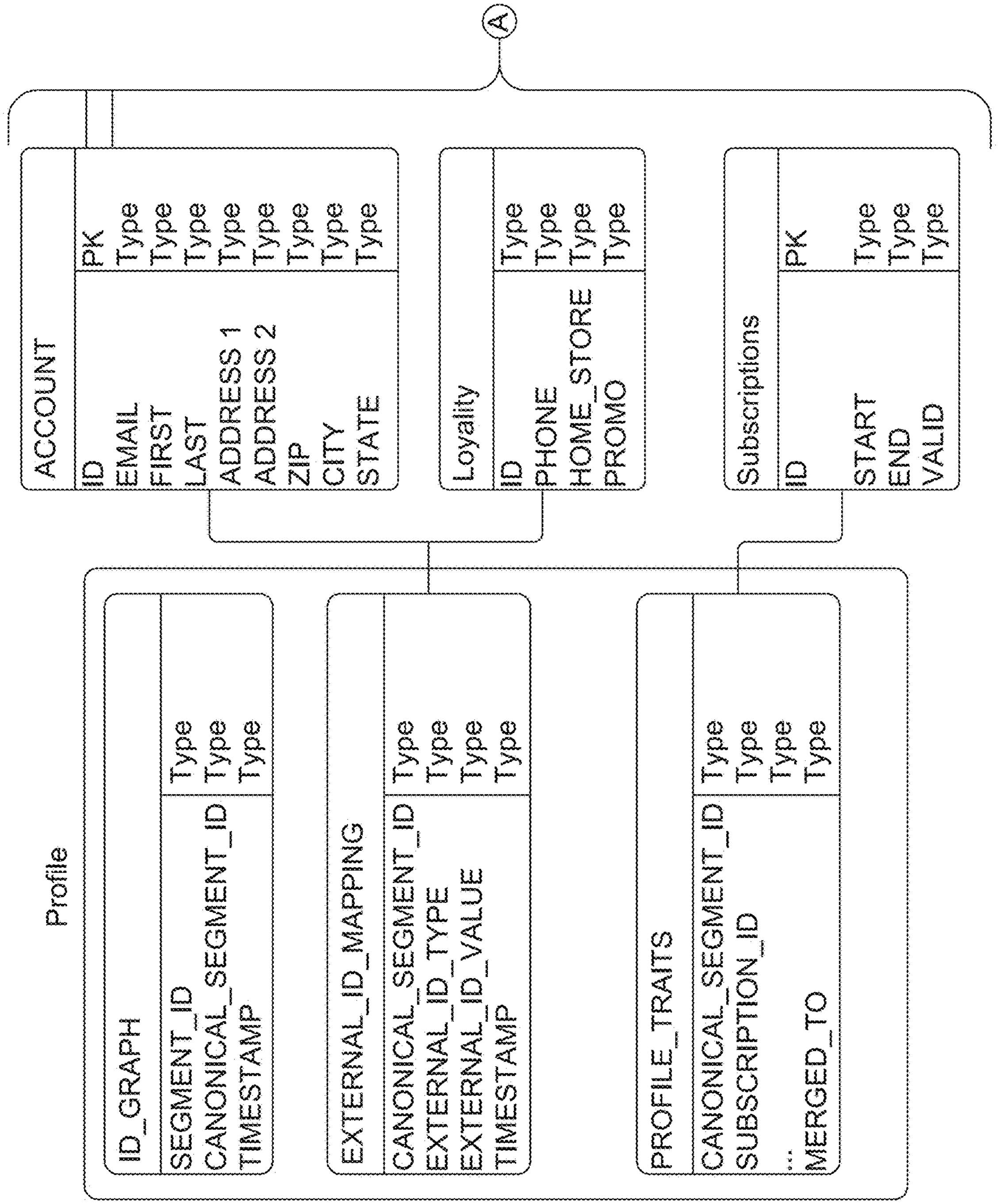
FIG. 3 is a conceptual diagram illustrating an example relational database structure designed to support a customer data warehouse.
Figure 3:
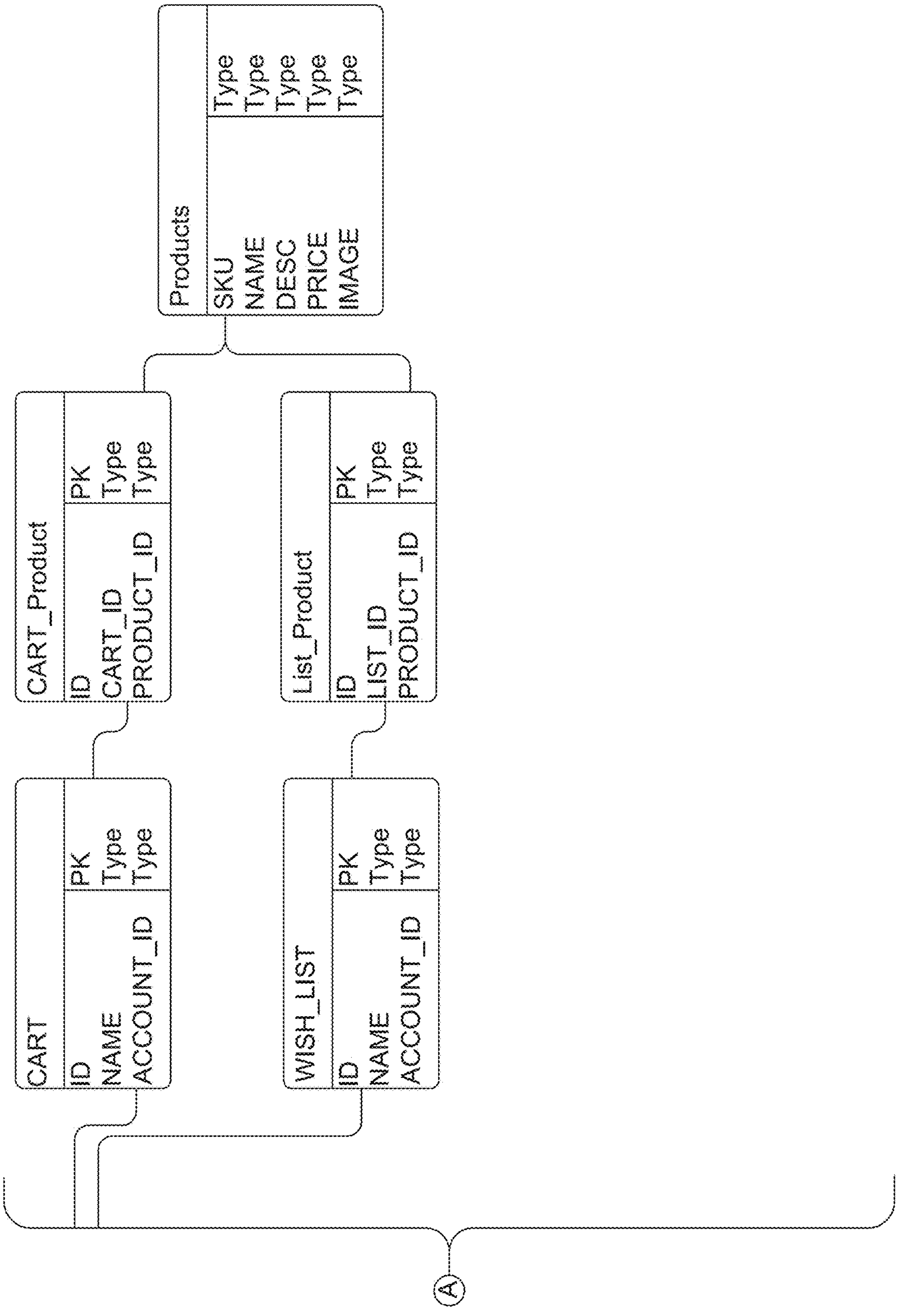

FIG. 3 is a block diagram depicting consumption from a profile patch stream. A Data Graph Service module 202 may be responsible for parsing the data graph specification written in a configuration language such as HCL. It converts the textual language representation into an object representation that can be understood and manipulated by other system components. The Data Graph Service may run on a server within a SaaS provider's infrastructure, with sufficient computational resources to handle parsing operations.

A Control Plane module 204 may serve as the central management module for the data graph system. It stores the object representation of the data graph and handles the retrieval and updating of this representation as needed by other services. As a core component of the SaaS infrastructure, the Control Plane may be hosted on a secure, scalable server environment with high availability and backup mechanisms.

A Warehouse Discovery Service (WDS) module 206 may be tasked with validating the actual warehouse structure against the data graph specification. It monitors the warehouse for changes and provides detailed metadata to downstream services, such as the Audience Builder. The WDS module 206 may operate within the SaaS environment, potentially with direct connections to the data warehouse for real-time monitoring and validation.

A User Interface (UI) module 208 may provide a graphical and/or textual interface for users to interact with the data graph. It includes a code editor for authoring the configuration language (e.g., HCL) specification and a graphical visualization tool for representing the data graph. The UI may be accessed through a web browser and hosted on web servers as part of the SaaS offering, ensuring cross-platform compatibility and ease of access for users.

A Public API (PAPI) module 210 may provide a programmatic interface to the data graph system, allowing users and external systems to interact with the service programmatically. It mirrors the capabilities of the UI, enabling operations such as retrieving, updating, and validating the data graph. The Public API may be exposed over the internet, such as through a RESTful interface, and may be secured using one or more authentication and/or authorization mechanisms.

The Data Graph Service module 202 may interact with the Control Plane module 204 to store the parsed data graph and with the Warehouse Discovery Service 206 to validate the data graph against the actual warehouse schema. The Control Plane module 204 receives the object representation from the Data Graph Service module 202 and provides access to this data for the Warehouse Discovery Service module 206 and the UI module 208. It also interacts with the PAPI module 210 to facilitate programmatic access. The WDS module 206 interacts with the Control Plane module 204 to retrieve the data graph specification and with the actual data warehouse to perform validation and change detection. It may also send notifications or alerts to the UI module 208 regarding any discrepancies or changes detected. The UI module 208 interacts with the Control Plane module 204 to fetch and display the data graph and with the PAPI module 210 to submit changes made by the user. It may also receive updates from WDS module 206 to reflect any changes in the warehouse schema. The PAPI module 210 interacts directly with the Control Plane module 204 to execute API requests and may also interface with the WDS module 206 for operations related to warehouse schema validation.

In a Software-as-a-Service (SaaS) environment, these modules may be deployed as a set of microservices, each running in its own containerized environment for scalability and isolation. The services may communicate over a secure internal network, with the Control Plane acting as the central hub for data exchange. The User Interface and Public API would be exposed to the internet through a secure gateway that manages traffic and enforces security policies.

The data warehouse, which may be hosted by a SaaS provider or by a user, may be connected to the WDS through secure data connectors that allow for real-time monitoring and validation. The system may be managed and monitored through a centralized orchestration platform that ensures optimal performance, security, and reliability.

FIG. 3 is a schematic of an example relational database structure designed to support an example customer data warehouse. The diagram delineates several interconnected entities, each with a set of attributes that collectively form the schema of a retail or e-commerce data model.

In example embodiments, a Profile entity may be part of a customer data model. It may include a variety of attributes, such as ID_GRAPH and S_ID, which may be used to uniquely identify user profiles within the system. The CANONICAL_S_ID attribute may be a standardized identifier that may be used across different groupings or tables for consistency. Timestamp-related attributes may indicate the recording of temporal data, which may be used for tracking changes or activities over time.

A structure such as EXTERNAL_ID_MAPPING within the Profile entity may be used to link external identifiers to the canonical profile IDs, facilitating the integration of data from various sources. This mapping may include an EXTERNAL_ID_TYPE to specify the kind of identifier (e.g., email, phone number) and an EXTERNAL_ID_VALUE to store the actual identifier value. The presence of a TIMESTAMP attribute makes is possible for each mapping to be time-stamped, to, for example, track the history of changes.

PROFILE_TRAITS may be another attribute within the Profile entity, which may be used to store one or more various characteristics or behaviors associated with the user profile, such as subscription preferences indicated by SUBSCRIPTION_ID. The MERGED_TO attribute may represent a linkage to another profile (e.g., in cases where duplicate profiles are consolidated).

The CART entity is structured to represent shopping carts within the data warehouse. It includes a Cart_Product attribute, which may be a join table to establish a many-to-many relationship between carts and products. Attributes prefixed with PK may be primary keys, which may ensure the uniqueness of each cart record. The inclusion of EMAIL, FIRST, and LAST names within the cart entity may be a denormalized schema for performance optimization or a specific use case requirement.

The Products entity includes attributes such as KSKU for stock-keeping units, NAME, DESC for descriptions, PRICE, and IMAGE. These attributes may correspond to a product catalog in a retail database, allowing for detailed product information to be stored and retrieved.

WISH_LIST mirrors the structure of the CART entity but is tailored for items that users intend to purchase later. It includes a List_Product attribute, which may be another join table that connects wish lists to products, enabling users to add multiple products to their wish lists.

The Loyalty entity captures details of a loyalty program. Attributes like PHONE, HOME_STORE, PROMO, and the trio of START, END, and VALID may be for a system that tracks loyalty program memberships, promotional eligibility, and the validity period of the loyalty status.

The Profile entity may function as a central hub for various data points that enable robust identity resolution. Attributes such as ID_GRAPH and S_ID may be used in creating a network of identifiers, allowing for the tracing of customer interactions across multiple channels. The CANONICAL_S_ID serves as a standardized identifier that ensures consistency and facilitates the integration of data from diverse sources. The EXTERNAL_ID_MAPPING may allow for the linkage of external identifiers, such as email addresses and phone numbers, to the canonical profile IDs. The TIMESTAMP associated with each mapping captures the moment of mapping, which may be used for tracking the evolution of customer profiles over time.

Within the Profile entity, the PROFILE_TRAITS attribute is designed to store a wide array of customer traits, including preferences or subscriptions indicated by a SUBSCRIPTION_ID. The MERGED_TO attribute is used to manage the consolidation of duplicate profiles, thereby enhancing the accuracy of customer data.

The CART entity represents the shopping carts associated with customer accounts and includes a Cart_Product attribute that likely points to a join table, enabling the representation of multiple products within a single cart. The inclusion of personal identifiers such as EMAIL, FIRST, and LAST names within the CART entity suggests a design choice to optimize for performance or to support specific use cases where quick access to customer information is required.

The Products entity contains product information and is fundamental to various functionalities of the system, such as inventory management and product recommendations.

The WISH_LIST entity mirrors the CART entity but is tailored for items that customers intend to purchase at a later time. The List_Product attribute indicates a join table that connects wish lists to products, allowing for the creation of personalized wish lists for each customer.

The Loyalty entity captures the intricacies of a loyalty program, with the ability to track loyalty program memberships through attributes such as PHONE and HOME_STORE. The PROMO, START, END, and VALID attributes are used to manage promotional campaigns and the validity of loyalty statuses, which are crucial for customer retention strategies.

In essence, the described data model is a sophisticated construct that not only stores customer data but also enables complex analysis and operational capabilities, such as identity resolution, audience group creation, and targeted marketing initiatives. The model is designed to be flexible and robust, capable of adapting to the evolving needs of e-commerce and retail businesses.

The data warehouse may operate under a set of assumptions related to its design and functionality. Firstly, it may be assumed that the data warehouse (DWH) is synchronizing profiles via profile sync into a particular folder, ensuring that customer data is consistently updated and maintained. Secondly, the DWH may be configured with DBT (Data Build Tool) scripts and for creating materialized views of the customer data, which may be used for efficient query performance and data manipulation.

Another assumption may be that all tables representing customer data are organized under a single 'folder' or schema (e.g., called 'cust'), which simplifies the management and querying of customer-related information. In contrast, the products table may reside in its own distinct folder (e.g., named 'prod'), reflecting a separation of concerns and allowing for independent management of product data.

The warehouse may be assumed to use a single 'database' in its architecture to, for example, apply a centralized approach to data storage and retrieval. Additionally, there may be multiple main entity 'paths' that the warehouse intends to relate, which may include relationships between profiles, accounts, carts, and products, as well as other paths involving wish lists, loyalty programs, and subscriptions. These paths may be designed to reflect the various ways users interact with the website and their associated data points, such as accounts containing customer details related to profiles via customer email, and subscriptions tracked by custom traits on the profile.

These assumptions form the foundation upon which the data warehouse's structure and operations are built, guiding the design of the data graph specification and the subsequent translation of these relationships into actionable insights and functionalities within the warehouse environment.

The example code depicted in FIGS. 4A-4C outlines a detailed model for representing the relationships and entities within a data warehouse, specifically designed for a customer data platform. This model is expressed using a custom subset of HashiCorp Configuration Language (HCL), which is tailored to define the structure and relationships of data within the warehouse. Below is a detailed description of the example code:

Data Graph Block

The code begins with a data_graph block, which is a declaration of the data model being defined. Within this block, a version attribute is specified ("v0.0.4"), indicating the version of the data graph specification being used. This allows for version control and future updates to the data graph structure.

Profile Block

Inside the data_graph block, there is a profile block that specifies the folder or schema location where the profile tables are located within the warehouse. The materialization attribute is set to "dbt", which indicates the use of the Data Build Tool for transforming and preparing the data. This attribute can take other values, but in this example, it is set for a DBT materialization.

Relationship Blocks

Within the profile block, multiple relationship blocks define how entities within the data warehouse are related to each other. Each relationship block specifies a related_entity that points to another entity in the data graph.

For example, the relationship "Account" block defines a relationship to the account entity. It uses an external_id block to specify the type of external identifier ("email") and the corresponding join_key ("email"), which is the column in the account table that will be used to join with the profile data.

The relationship "Carts" block defines a relationship to the cart entity and specifies a join_on condition that matches the account_id from the cart entity with the id from the account entity.

Junction Table Blocks

For relationships that involve many-to-many connections, a junction_table block is used. For instance, the relationship "Products in Cart" block defines a relationship to the product entity through a junction table. The junction_table block specifies the primary_key, the reference to the junction table ("cust.cart_product"), and the conditions for the left and right joins. These join conditions determine how the tables are related through the junction table.

Entity Blocks

Following the relationship definitions, entity blocks define the individual entities and their corresponding tables within the warehouse. Each entity block includes a table_ref attribute that points to the actual table in the warehouse, a primary_key attribute that specifies the primary key column of the table, and an enrichment_enabled attribute that indicates whether additional data enrichment is possible for this entity.

For example, the entity "account" block refers to the "cust.account" table with a primary key of "id", and enrichment is enabled.

FIGS. 4A-4C visually represent the code blocks described above, showing the hierarchical structure of the data graph, the relationships between entities, and the attributes of each entity.

The example code provides a comprehensive model for representing complex data relationships within a warehouse environment. It defines the structure of the data graph, the entities involved, and the relationships between them, using a custom HCL-based language tailored for data graph configuration. This model may be used to enable advanced data operations such as audience building and query generation, which are fundamental to the functionality of customer data platforms.

The example code provided and illustrated in FIGS. 4A-4C serves as a blueprint for modeling the data relationships within a data warehouse, specifically tailored for a customer data platform. The code is written in a custom subset of HashiCorp Configuration Language (HCL), which is chosen for its ability to clearly define and manage infrastructure as code. This choice is particularly relevant for data teams who prefer to work with code and require version control capabilities, as it allows them to define the data graph in a familiar and programmable format.

The code outlines the structure of the data graph, detailing the entities, their attributes, and the relationships between them. It is designed to be both human-readable and machine-parsable, enabling a seamless transition from data modeling to actual database schema implementation. The data_graph block sets the stage for the entire model, while the profile block and subsequent relationship and entity blocks provide the specifics of how data is interconnected within the warehouse.

The code acts as a declarative specification of the data model, which is essential for the system to understand how different pieces of data are related. It allows for the creation of a logical model that reflects the real-world interactions and relationships between various data entities, such as customers, accounts, carts, and products.

The logical model defined by the code may not only be used for backend data processing, but also for the user interface (UI) and the public API (PAPI) that interacts with the system. The UI may include a code editor for users to directly input and modify the HCL code, as well as a graphical representation of the data graph for easier visualization and understanding. The UI may be designed to cater to non-technical users, such as marketers, enabling them to build audiences and perform data operations without deep technical knowledge.

The public API, on the other hand, provides programmatic access to the system, allowing for automation and integration with other systems. It ensures that everything that can be done through the UI can also be achieved via the API, with the exception of visualizations, which are inherently UI-centric. This API accessibility is particularly important for data teams who may want to manage their data graph definitions within their own version control systems, such as Git, and deploy changes through automated pipelines.

In essence, the example code demonstrates how to bridge the gap between the technical data model and the more user-friendly interfaces of the system. It allows for a consistent and accurate representation of the data warehouse's structure, which can be manipulated through both the UI and the API, providing flexibility and control to different types of users within the organization.

The translation to the control plane involves converting the logical data graph model into a structured format that can be stored, retrieved, and/or manipulated by the system's backend services. This process enables the system to understand and enforce the relationships between different data entities as defined by the data graph. The control plane serves as the central authority that manages these configurations and ensures that they are consistently applied across the system.

The Entity Group table of FIG. 5 is a conceptual representation of how the data graph's entity groups may be stored within the control plane. The proposed structure of this table includes several columns:

id: A unique identifier for the entity group.

workspace_id: Identifies the workspace to which the entity group belongs.

name: A human-readable name for the entity group.

description: A text description of the entity group's purpose or contents.

space_id: An identifier for the space within the workspace.

source_id: An identifier for the source of the data.

profile_folder: Indicates the location of profile tables within the warehouse.

materialization: Specifies the materialization strategy (e.g., none, dbt, and so on).

revision_sha: A SHA hash representing the version of the entity group configuration.

created_at and updated_at: Timestamps indicating when the entity group was created and last updated.

The Entities table of FIG. 6 outlines individual entities that are part of an entity group. The proposed structure includes:

id: A unique identifier for the entity.

entity_group_id: Links the entity to its parent entity group.

name: The name of the entity.

description: A description of the entity.

slug: A URL-friendly version of the name, typically used in API endpoints.

table_name: The name of the table in the warehouse that corresponds to the entity.

folder_name: The folder or schema where the table is located.

primary_key: The primary key column of the table.

model_id: An identifier for the model associated with the entity.

type: Indicates whether the entity represents an entity or an event.

created_at and updated_at: Timestamps for the creation and last update of the entity record.

The Entities Relationship table of FIG. 7 captures the relationships between entities. It includes, for example:

id: A unique identifier for the relationship.

name: The name of the relationship.

slug: A slugified version of the name.

type: The type of relationship (e.g., profile_entity, entity, junction).

parent_entity_id and child_entity_id: Identifiers for the parent and child entities in the relationship.

entity_group_id: The identifier for the entity group to which the relationship belongs.

created_at and updated_at: Timestamps for when the relationship was created and last updated.

The Entities Relationship Options Table of FIG. 7 is designed to store configurable options for each relationship. It mirrors a key-value pair structure where each record is associated with a relationship and specifies a particular configuration option. The columns may include:

id: A unique identifier for the record.

relationship_id: Links the record to a specific relationship.

name: The name of the configuration option.

value: The value of the configuration option.

created_at and updated_at: Timestamps for when the record was created and last updated.

Name Value Pairings per Type Table (Doc 2)

Although not explicitly depicted in the figures, additional tables, such as a Name Value Pairings per Type table may be included, that contains predefined sets of name-value pairs that are expected for different types of relationships. For example, an entity type might have an identity_strategy with various example values such as id_resolution or a customer-entered trait name.

The Entity Group table serves as a top-level organizational structure, grouping related entities together. The Entities table defines the individual entities within each group, and the Entities Relationship table specifies how these entities are related to one another. The Entities Relationship Options table provides additional configuration for these relationships, allowing for customization and flexibility in how the data graph is implemented.

The Name Value Pairings per Type table may serve as a reference for valid configurations in the Entities Relationship Options table, ensuring that the system can validate and enforce the data graph's structure based on the types of relationships defined.

Together, these tables form a comprehensive system for storing and managing the data graph within the control plane, translating the logical model into a format that can be enforced and utilized by the system's backend services. This structure enables the system to maintain a clear and consistent understanding of the data warehouse's schema and the relationships between different data entities.

FIGS. 8A-8C are code listings of example APIs that illustrate how the system's programmatic interface interacts with the data graph and the underlying entities. These examples demonstrate the retrieval of profile entities and related entities based on specific identifiers, such as entity group IDs and entity slugs.

getProfileEntity API

The getProfileEntity API function takes an entity_group_id as an input parameter, which corresponds to a specific grouping of entities within the data graph. The purpose of this API call is to return all 'top-level' entities associated with the given entity group. The response from this API call includes a (e.g., JSON) object that contains various attributes of the profile entity, such as the type (e.g., "profile"), folder name, materialization strategy, graph revision, and a list of relationships. Each relationship is represented as a nested object within the relationships array, detailing the relationship's ID, type, name, strategy for identity resolution (e.g., "id_resolution" or "trait"), and the specific join keys used to link entities.

getRelatedEntitiesBySlugs API

The getRelatedEntitiesBySlugs API function accepts an array of entity slugs as input and returns a mapping of entities keyed by their slugs. This API call is designed to fetch detailed information about specific entities, including their type, name, primary key, folder name, table name, and any relationships they may have. The relationships are again provided as nested objects, with attributes such as the relationship name, slug, type, join table information, and join keys that define how entities are connected within the data graph.

API Response Structure

The responses from these API calls are structured in a way that provides a comprehensive view of the data graph's entities and their interconnections. The JSON format allows for easy parsing and integration with client applications, enabling developers to programmatically access and utilize the data graph within their own systems.

API Usage

These API examples enable external systems to interact with the data graph. They provide the necessary endpoints for retrieving entity information and understanding the relationships between data points within the warehouse. By using these APIs, developers can build applications that leverage the rich data model defined by the data graph, allowing for complex data operations and analytics to be performed outside the core system.

The API examples demonstrate the system's capability to expose the data graph's structure and relationships through a programmatic interface, facilitating integration with other applications and services. The detailed responses provide all the necessary information for developers to understand and work with the data graph, making these APIs a powerful tool for extending the system's functionality.

Figure 9:
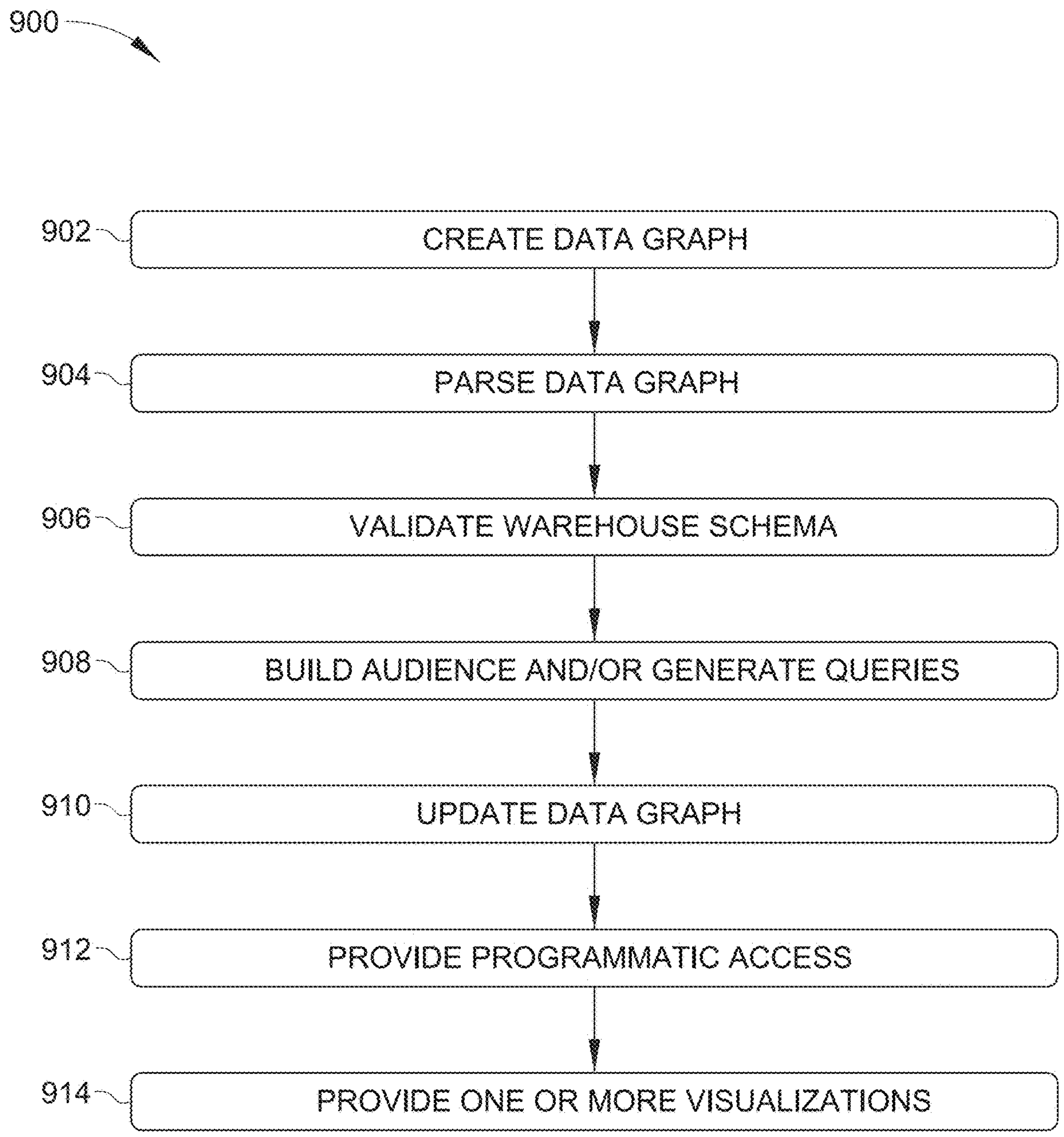
FIG. 9 is a flowchart illustrating an example workflow of the system for managing the data graph.

FIG. 9 is a block diagram illustrating an example workflow of the system for managing the data graph. In example embodiments, the operations depicted in FIG. 9 are performed by one or more of the modules of FIG. 2. As shown, the system addresses several technological challenges associated with handling complex data relationships within a data warehouse.

At operation 902, a data graph is created. The initial creation of the data graph involves defining a structured representation of the data warehouse's schema. This step addresses the problem of representing complex, interrelated data in a way that is both understandable and actionable. By using a configuration language (e.g., HCL), the system provides a clear and version-controlled method for defining entities and their relationships, overcoming the challenges of ambiguity and inconsistency in data representation.

At operations 904, the data graph is parsed. Parsing the data graph translates the user-defined configuration into an internal representation that the system can process. This operation solves the problem of bridging the gap between human-readable configuration files and machine-parsable data structures. It ensures that the logical model is accurately captured and can be used programmatically by the system.

At operations 906, the Warehouse Schema is validated. Validation ensures that the data graph's structure corresponds to the actual data warehouse schema. This step addresses the problem of data graph and warehouse schema synchronization. By verifying that the tables and columns exist as specified, the system prevents errors that could arise from discrepancies between the data graph and the physical data warehouse, such as missing tables or incorrect data types.

At operations 908, an audience is built and/or queries are generated. Utilizing the data graph to build audiences or generate queries allows the system to create targeted data sets for end-users. This operation overcomes the challenge of manually crafting complex queries or data groupings, which can be error-prone and time-consuming. The system automates this process, leveraging the predefined relationships in the data graph to efficiently produce accurate and relevant results.

Practical applications for the queries generated from the data graph include the following non-exclusive list of applications.

Customer Data Integration. Queries can integrate customer data from various sources, where the data graph specification includes entities like PROFILE_TRAITS and EXTERNAL_ID_MAPPING. This integration can provide a unified view of customer profiles.

Audience Building for Marketing. The system can be used to build audiences for marketing purposes by leveraging the relationships defined in the data graph, such as those between profiles, accounts, and shopping carts.

E-commerce Analytics: The system can generate queries for analyzing e-commerce activities, including shopping cart analysis, wish list trends, and purchase histories, as indicated by the CART and WISH_LIST entities.

Loyalty Program Management. Queries can manage and analyze customer loyalty programs by examining the Loyalty entity and its related attributes like PHONE, HOME_STORE, and PROMO.

Product Relationship Analysis. The system can explore the relationships between products, such as those found in join tables like Cart_Product and List_Product, to understand product affinities and cross-selling opportunities.

Subscription Services Analysis. Queries can analyze subscription services, tracking sign-ups, renewals, and the effectiveness of subscription-based offerings.

Identity Resolution. The system can resolve customer identities across different systems and platforms by using the EXTERNAL_ID_MAPPING and PROFILE_TRAITS entities to link various identifiers like emails and phone numbers to unique customer profiles.

Custom Audience Grouping or Dividing: Leveraging the data graph, queries can create custom audiences for targeted campaigns, such as through the use of traits and subscriptions to define audience groupings.

Real-time Data Synchronization. Queries can ensure real-time data synchronization across different systems, maintaining up-to-date customer information.

Data Warehouse Schema Validation. The system can validate the data warehouse schema against the data graph specification, ensuring that the warehouse structure supports the defined data relationships.

At operation 910, the data graph is updated. The ability to update the data graph is crucial for maintaining its relevance over time. This operation addresses the problem of evolving data requirements and changes in the data warehouse structure. By allowing updates, the system ensures that the data graph remains an accurate reflection of the warehouse schema and supports the latest business logic.

At operation 912, programmatic access is provided. Offering programmatic access through APIs solves the problem of integrating the data graph with external systems and automating data operations. This operation enables developers to interact with the data graph without manual intervention, facilitating seamless integration and extending the system's capabilities to other applications.

At operation 914, one or more visualizations are provided. Visualizations of the data graph help users understand the complex relationships between entities. This operation addresses the challenge of data graph complexity, making it more accessible to non-technical users. By providing a graphical representation, the system enhances user comprehension and facilitates easier management of the data graph.

Visualizations of a data graph may encompass a variety of generic graphical representations that elucidate the structure and interconnections within a dataset. For instance, a generic entity-relationship diagram could serve to illustrate the relationships between different abstract data entities, with varying line styles denoting the nature of their associations. A network graph might be utilized to display the interplay between disparate data points, identifying central nodes and the density of connections. A tree map could offer a bird's-eye view of hierarchical data, with nested rectangles representing parent-child relationships in the data structure. Sankey diagrams could be leveraged to depict the movement or transformation of data across different stages or processes within the system, with line widths proportional to the data flow magnitude. These visualizations aim to provide a clear and simplified understanding of the data architecture, fostering ease of analysis and interpretation for users.

User interfaces for interacting with data graph visualizations may include intuitive web-based dashboards that feature drag-and-drop capabilities, allowing users to customize their view of the data graph. They might also offer interactive tools such as sliders and filters for dynamically adjusting the scope of the data displayed, or clickable nodes and edges within the visualizations that reveal additional layers of detail on demand. Additionally, these interfaces could incorporate search bars for quick navigation to specific entities or relationships, and tabbed panels that present different types of visualizations—like ER diagrams, network graphs, or Sankey diagrams—for comparative analysis. The goal of these interfaces is to make the exploration of complex data structures as user-friendly and accessible as possible, regardless of the user's technical expertise.

Interacting with the data graph through a user interface can directly influence the underlying code that defines the graph's structure. For example, when a user employs the interface to add a new entity or modify an existing relationship, these actions trigger automated updates in the data graph's configuration language, such as HCL, to reflect the changes. Similarly, deleting an entity through the UI would result in the corresponding code being removed or altered in the data graph's specification. The interface acts as a bridge, translating user actions into real-time code adjustments, ensuring that the visual representation and the codebase remain synchronized. This dynamic interaction allows for a seamless and immediate translation of high-level user operations into low-level code modifications, streamlining the process of maintaining and evolving the data graph.

Additional operations not explicitly shown in FIG. 9 may include one or more of the following.

Monitoring for Changes. Continuously monitoring the data warehouse for schema changes addresses the problem of keeping the data graph in sync with the warehouse. This proactive approach ensures that any alterations in the warehouse are quickly reflected in the data graph, maintaining its accuracy.

Handling Usage and Dependency Tracking: Tracking the usage of entities and their dependencies addresses the challenge of understanding the impact of changes within the data graph. This step ensures that modifications do not inadvertently disrupt operations or data flows that rely on specific entities, thereby preventing service outages and data inconsistencies.

Enforcing Data Graph Integrity: Enforcing the integrity of the data graph by preventing unauthorized changes to critical entities solves the problem of maintaining stable and reliable data operations. This safeguard protects against disruptions that could result from the removal or alteration of entities that are integral to ongoing processes.

User Interface Interaction: Providing a user interface for direct interaction with the data graph overcomes the challenge of making the data graph accessible to users with varying levels of technical expertise. The UI allows users to edit, manage, and visualize the data graph without needing to understand the underlying configuration language or database schema.

By addressing these technological problems, the system ensures that the data graph remains a robust, accurate, and user-friendly tool for managing complex data relationships within a data warehouse.

In example embodiments, one or more extra validation operations may be performed to ensure that the customer's language configuration for the data graph conforms to the system's specifications and requirements. These validation steps are critical for maintaining the integrity and functionality of the data graph within the warehouse audiences. Here is a description of some example validation steps:

Unique Entity Names: The system requires that all entity names within the data graph be unique and non-duplicated. This validation step addresses the problem of potential conflicts or ambiguities that could arise from having multiple entities with the same name. By enforcing unique entity names, the system ensures that each entity can be distinctly identified and referenced, which is essential for generating accurate SQL queries and maintaining clear relationships between entities.

Unique Table References: Similarly, the system mandates that all table_ref attributes, which point to the actual tables in the warehouse, must be unique. This prevents the scenario where multiple entities erroneously point to the same table, which could lead to data integrity issues and confusion in data operations. Ensuring unique table references helps maintain a one-to-one mapping between entities in the data graph and the corresponding tables in the warehouse.

Unique Relationship Names: Each relationship name within the data graph must also be unique and non-duplicated. This validation step is crucial because relationship names are used to generate slugs (simplified strings for use in URLs or identifiers), which must be unique to prevent routing or identification errors within the system. Unique relationship names help avoid conflicts and ensure that each relationship can be accurately invoked or queried.

Valid Relationship References: The related_entity fields in relationship definitions must correspond to an actual entity defined within the data graph. This validation ensures that the relationships established in the data graph are based on existing entities, preventing errors that could occur from referencing non-existent or undefined entities.

Nesting Depth Limitation: The system imposes a limit on the nesting depth of entities and relationships. This is to prevent overly complex and potentially unmanageable data structures. The limit includes profiles, entities, and junction tables that are referenceable in the Audience Builder, ensuring that the data graph remains comprehensible and performant.

Mutual Exclusivity of Join_on and Junction Blocks: The join_on and junction blocks within a relationship definition are mutually exclusive. This means that a relationship can either be defined by a direct join condition (join_on) or through a junction table, but not both simultaneously. This validation step prevents conflicting or redundant relationship definitions, which could lead to incorrect data associations or query generation errors.

Required Parameter Presence: The system checks for the presence of required parameters in the configuration. For example, if an id_graph_ref is necessary for a profile but is missing, this would trigger an error message. This ensures that all necessary information is provided for the data graph to function correctly, and it helps users correct their configurations before they are processed by the system.

Unused Entity Handling: Entities that are not used in any relationships and are not marked for enrichment may be flagged. This step is important for identifying orphaned entities that do not contribute to the data graph's functionality and could potentially be pruned to simplify the model.

In example embodiments, a WDS validation on save attempt is performed to ensure the integrity and accuracy of the data graph when a user attempts to save their configuration. This validation process is designed to catch potential issues that could lead to errors in data processing or inconsistencies between the data graph and the actual data warehouse schema. Here's a description of some example WDS service validation steps:

Existence of Referenced Tables and Columns: When a user attempts to save their data graph configuration, the WDS checks that all referenced tables and columns within the data graph actually exist in the data warehouse. This step is crucial for preventing the creation of a data graph based on incorrect or outdated warehouse schema information. By validating the existence of these tables and columns, the WDS ensures that the data graph accurately reflects the current state of the data warehouse, which is essential for generating valid SQL queries and maintaining data integrity.

Verification of Join Conditions: The WDS also verifies that the join_on conditions specified in the data graph are valid based on the warehouse schema. This includes checking that the columns used in the join conditions are present and compatible for joining. This validation step addresses the problem of incorrect join logic, which could result in faulty data relationships and potentially lead to incorrect data sets being produced.

Existence of Junction Tables: For relationships defined through junction tables, the WDS validates that the specified junction tables exist within the data warehouse. Junction tables are often used to represent many-to-many relationships, and their existence is vital for correctly mapping these complex relationships within the data graph.

Verification of Junction Table Columns: In addition to checking the existence of junction tables, the WDS validates that the columns used for left and right joins in the junction table are present and correctly defined. This ensures that the many-to-many relationships are accurately represented and that the data graph can be used to generate correct SQL queries for these types of relationships.

By performing these validation steps, the WDS service maintains the reliability and functionality of the data graph. It acts as a safeguard against common configuration errors that could otherwise lead to significant issues in data processing and analysis. The validation on save attempt is an example of proactive error prevention, helping users to trust that their data graph configurations will work as intended and that the system will produce accurate and reliable results based on their specifications.

Example Mobile Device

Figure 10:
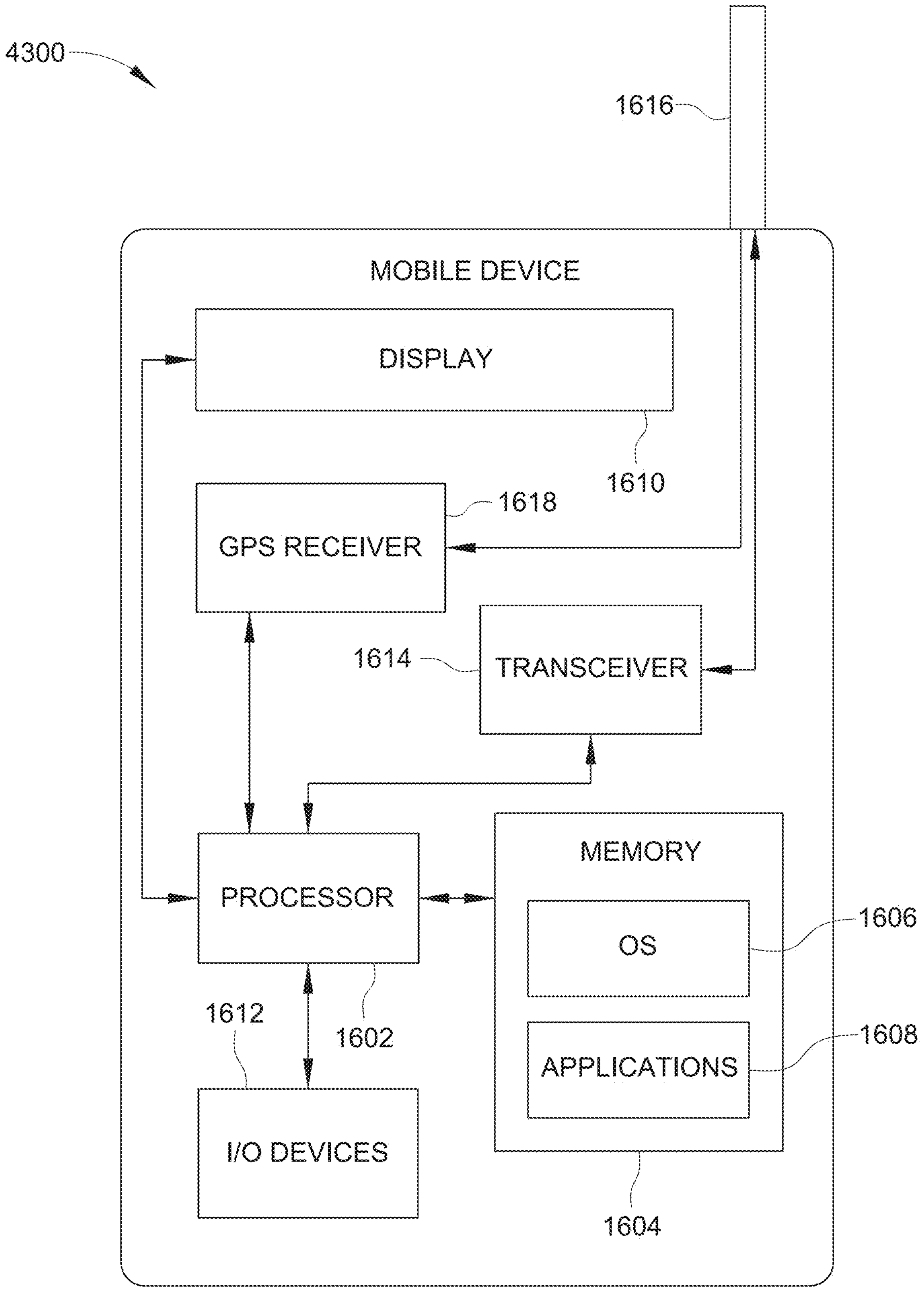
FIG. 10 is a block diagram of an example mobile device that may be used to access or interact with the system and services described herein.

FIG. 10 is a block diagram illustrating a mobile device 4300, according to an example embodiment.

The mobile device 4300 can include a processor 1602. The processor 1602 can be any of a variety of different types of commercially available processors suitable for mobile devices 4300 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 4300. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
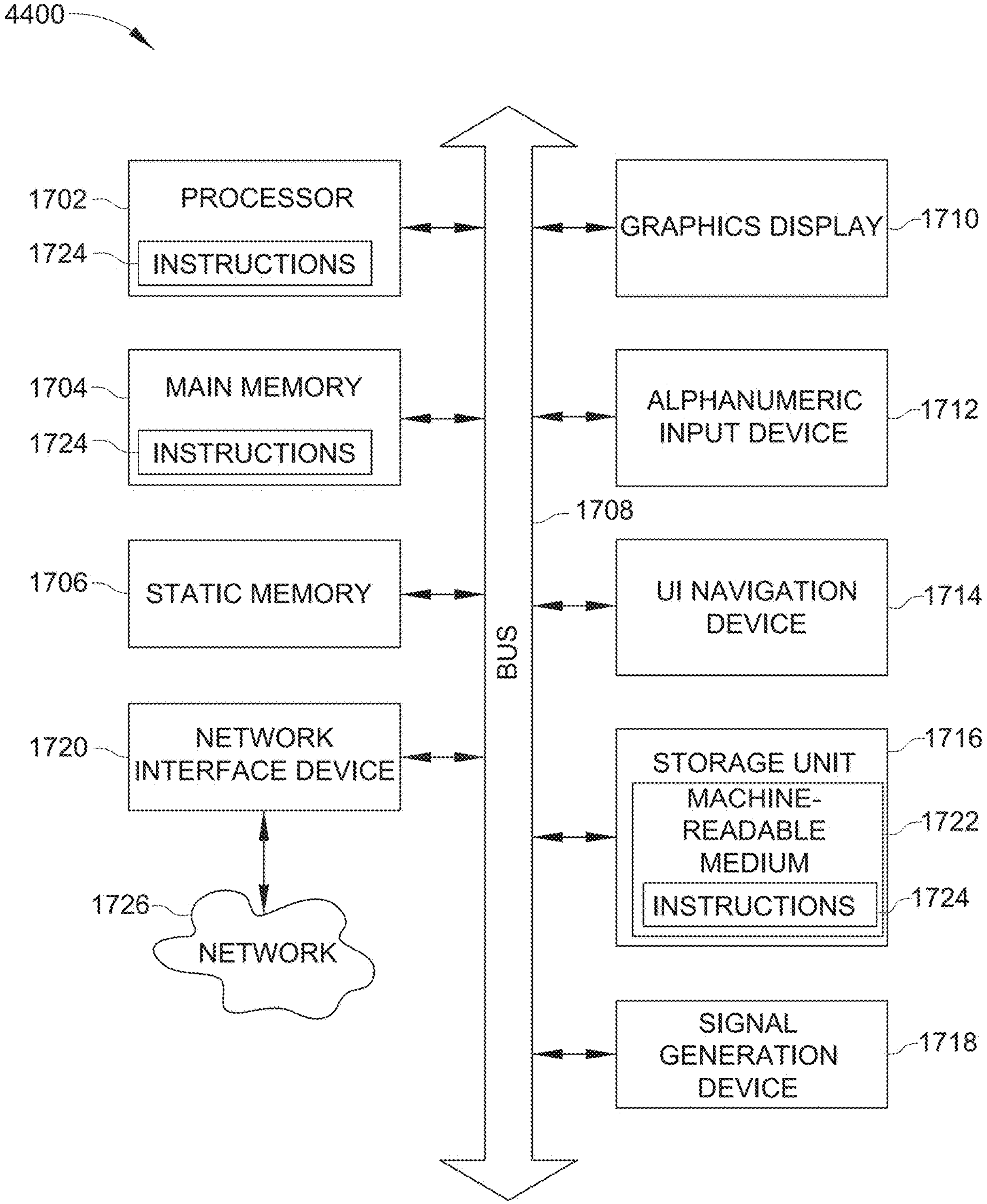
FIG. 11 is a block diagram of an example computer system, representing a machine within which instructions for causing the machine to perform any one or more of the methodologies discussed herein may be executed.

FIG. 11 is a block diagram of an example computer system 4400 on which methodologies and operations described herein may be executed, in accordance with an example embodiment.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4400 includes a processor 1702 (e.g., a central processing unit (CPU), a graphics processing unit (GPU) or both), a main memory 1704 and a static memory 1706, which communicate with each other via a bus 1708. The computer system 4400 may further include a graphics display unit 1710 (e.g., a liquid crystal display (LCD) or a cathode ray tube (CRT)). The computer system 4400 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 4400, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

In example embodiments, the Data Graph system may include a change detection feature or subsystem. The change detection feature may include a sophisticated mechanism designed to monitor and identify modifications within the data graph structure. This feature may be useful for maintaining the integrity and performance of the system by ensuring that any changes made to the data graph are promptly detected and appropriately managed. Additionally, the change detection feature may monitor the warehouse for changes that differ from the specification provided in the data graph. Thus, the change detection feature may not only detect whether changes to the data graph will impact downstream consumer of the data graph (e.g., linked audiences), but also generating and communicating asynchronous notifications if and when changes to the warehouse cause the warehouse to no longer be compatible with the specification of the data graph (e.g., as defined by a data engineer of the data graph).

The change detection feature may operate by continuously monitoring the data graph for any updates or alterations. This includes changes to entities, relationships, properties, and/or other structural components of the data graph. One goal of this feature may be to identify these changes in real-time, allowing the system to assess whether the modifications might impact existing functionalities or data flows.

In example embodiments, when a change is detected, the system categorizes it based on its potential impact. Changes are classified as either breaking or non-breaking. Breaking changes are those that could disrupt system operations or data integrity, requiring immediate attention and remediation. Non-breaking changes, while still important, do not pose an immediate risk to system stability and can often be integrated more seamlessly.

The Change Detection feature may include one or more of the following functionalities:

Real-Time Monitoring: Utilizing advanced algorithms and monitoring tools, the system keeps a vigilant watch over the data graph to detect changes as they occur.

Impact Assessment: Upon detecting a change, the system evaluates its potential impact. This assessment helps in deciding the necessary actions to mitigate any risks associated with the change.

Notification System: If a significant, potentially disruptive change is detected, the system triggers notifications to alert system administrators and developers. This allows for quick response and remediation efforts to address the change.

Automated Handling: For certain types of changes, especially non-breaking ones, the system can automatically handle the integration and updating processes without manual intervention, streamlining operations and reducing downtime.

Integration with Other System Components: The Change Detection feature is integrated with other components of the Data Graph system, such as the Warehouse Discovery Service (WDS) and the control plane. This integration ensures that changes detected are reflected across all relevant parts of the system, maintaining consistency and accuracy in data handling and processing.

User Interface and Visualization: The feature is also reflected in the system's user interface, where changes can be visualized and tracked. Users can view a log of detected changes, assess their impact, and review the actions taken by the system in response to these changes. This transparency helps with maintaining trust and control over the data graph management process.

By effectively detecting, assessing, and managing changes, the change detection feature supports the system's scalability and adaptability, allowing it to support complex data environments and sophisticated user requirements.

In example embodiments, the change detection system is a component that monitors the data graph for any changes, such as updates, additions, or deletions of entities. This system is constantly active, scanning the data graph to identify changes as they occur. Once a change is detected, the Change Detection system categorizes the change (e.g., breaking or non-breaking) and captures detailed information about the change, including which entities are affected and the nature of the modification.

In example embodiments, the Entities Change Stream specifically handles the streaming of changes related to entities within the data graph. It acts as a specialized conduit through which detailed information about entity changes is communicated to various parts of the system or external consumers that need to stay updated with the latest state of the data graph. Upon receiving information about a change from the Change Detection system, the Entities Change Stream packages this information into structured events or messages. These events are then streamed in real-time to subscribers, which could include internal services that manage caching, search indexing, or business logic, as well as external systems that rely on up-to-date data.

In example embodiments, the Event Emitter serves a broader purpose than the Entities Change Stream by handling all types of events within the system, not just those related to entity changes. It is responsible for broadcasting various system-wide events that might include system alerts, performance metrics, or other operational data in addition to data graph changes. Similar to the Entities Change Stream, the Event Emitter captures events from the Change Detection system but does so for a wider array of changes and system states. It then disseminates these events to relevant parts of the system or external endpoints, ensuring that all components remain synchronized and responsive to changes.

Entities Change Stream

In example embodiments, the Entities Change Stream is a component designed to manage and propagate real-time updates about changes to entities within the data graph. This ensures that any modifications, such as additions, deletions, or updates to entities, are captured and communicated substantially immediately across the system, facilitating a responsive and synchronized data environment. In example embodiments, the Entities Change Stream may also be configured to detect changes in the data warehouse that render the data warehouse inconsistent and/or incompatible with a specification of the data graph.

The Entities Change Stream functions as a real-time data pipeline that captures changes made to the entities within the data graph and streams these changes to various downstream services and systems that rely on this data. This streaming mechanism is essential for maintaining data consistency and integrity across the platform, especially in environments where data is frequently updated and accessed by multiple services simultaneously.

The operation of the Entities Change Stream involves one or more of the following processes:

Change Detection: The first step is the continuous monitoring of the data graph to detect any changes to entities. This involves tracking creations, updates, and deletions of entities within the data graph. The detection mechanism is designed to capture changes as they occur, without delay.

Change Capture: Once a change is detected, the specific details of the change, including the type of change (add, update, delete) and the attributes of the affected entities, are captured. This information is crucial for downstream processes that need to understand what has changed in the system.

Event Generation: For each detected change, an event is generated. These events are structured messages that encapsulate all relevant information about the change. The structure includes the entity ID, the type of change, a timestamp, and/or any other entity-specific data that might be relevant for consumers.

Streaming to Consumers: The generated events are then streamed in real-time to a message queue or a similar streaming platform, such as Apache Kafka. This platform manages the distribution of events to various consumers that have subscribed to the Entities Change Stream. These consumers could be internal services within the system, external applications, or even data analytics tools that process the streamed data for insights.

Consumption and Action: Downstream consumers receive the events and take appropriate actions based on their specific requirements. For example, a caching service might update its cache entries based on the changes, while a search indexing service might update its indices to reflect the new state of the data.

Integration with Other System Components: The Entities Change Stream may be integrated with the Warehouse Discovery Service (WDS) and the control plane of the Data Graph system. This integration ensures that the change stream accurately reflects the verified state of the data graph as maintained by the WDS. The control plane manages the configurations and policies related to the change stream, such as defining the granularity of events and managing access controls for different consumers.

User Interface and Visualization: The Entities Change Stream feature is supported by a user interface that allows system administrators to configure and monitor the stream. This interface typically provides tools for setting up stream subscriptions, monitoring the flow of events, and analyzing the performance of the streaming process. It may also offer debugging tools to help identify and resolve issues related to event streaming.

By efficiently streaming changes to entities, the entities change stream supports dynamic data-driven applications and services, enhancing the system's overall responsiveness and reliability.

Event Emitter

In example embodiments, an Event Emitter plays a role in managing and propagating changes across the system, particularly in response to modifications within the data graph. This component is designed to ensure that any updates or changes to the data graph are efficiently communicated to downstream services and applications that depend on this data.

In example embodiments, the Event Emitter acts as a communication bridge between the data graph and other components or services within the system. The Event Emitter may emit events or notifications whenever there are changes in the data graph, such as the addition, modification, or deletion of entities, relationships, or properties. These events inform other parts of the system about the changes, enabling them to react accordingly.

The operation of the Event Emitter can be broken down into one or more steps:

Detection of Changes: The first step involves detecting any changes in the data graph. This is closely tied to the Change Detection feature, which monitors the data graph for any updates. Once a change is identified, details about the change, such as the nature of the change and the elements affected, are prepared for emission.

Event Creation: Based on the detected changes, the Event Emitter creates specific events. These events are structured messages that contain all relevant information about the change, including the type of change, the data entities involved, and the impact level. The structure of these events is designed to be easily consumable by various components of the system.

Event Emission: Once the events are created, they are emitted to a messaging or event system, such as Kafka or a similar message queue system. This system is responsible for distributing these events to various subscribers or downstream services that have registered to receive updates about changes in the data graph.

Handling by Downstream Services: Downstream services receive the events and process them according to their specific requirements. For example, a service might update its cache, recompute data models, or trigger additional workflows in response to the received events. This step ensures that all parts of the system remain synchronized with the current state of the data graph.

Feedback and Logging: The Event Emitter also collects feedback from the downstream services about the handling of the events. This feedback is logged and analyzed to ensure the efficacy of the event emission process and to make improvements where necessary.

Integration with Other System Components: The Event Emitter is integrated with the Warehouse Discovery Service (WDS) and the control plane of the Data Graph system. This integration ensures that the events emitted are accurate and reflect the true state of the data graph as verified by the WDS. Additionally, the control plane manages the configuration and policies related to event emission, such as defining which changes are significant enough to trigger events and setting up the rules for event distribution.

User Interface and Visualization: The Event Emitter feature is supported by a user interface that allows system administrators to configure event emission rules, view logs of emitted events, and monitor the status of events as they are processed by downstream services. This interface provides critical visibility into the event emission process, helping to troubleshoot issues and optimize the system's responsiveness.

The Event Emitter helps ensure dynamic and efficient communication of changes across the system. By automating the emission of events in response to changes in the data graph, the feature supports the system's scalability, responsiveness, and consistency, making it an essential component of the overall data management infrastructure.

The collaboration between these components ensures a robust change management system within the Data Graph platform:

Data Consistency and Integrity: By streaming changes in real-time, the Entities Change Stream and the Event Emitter ensure that all parts of the system reflect the current state of the data graph, thereby maintaining data consistency and integrity.

System Responsiveness: Quick dissemination of changes through these components helps the system react promptly to modifications, enhancing overall responsiveness and reducing the risk of data conflicts or errors.

Scalability and Flexibility: The modular nature of these components allows the system to scale efficiently. As the volume of data or the number of system interactions grows, these components can handle increased loads, ensuring that performance remains optimal.

In example embodiments, the Entities Change Stream, Event Emitter, and Change Detection system are closely interlinked, each playing a role in the data management ecosystem of the Data Graph system. Their integrated functions ensure that the system remains dynamic, consistent, and reliable, capable of supporting complex data operations and real-time applications across diverse environments.

In example embodiments, various types of changes can occur within the Data Graph system. These changes may be categorized based on their potential impact on the system. For example, these changes may be classified at the entity and relationship levels, property level, and also include warehouse-level changes, providing a framework for managing updates efficiently and ensuring system stability.

Entity and Relationship-Level Changes

Definite Breaking Changes may include the deletion of any entity or relationship that is actively being referenced within the system. This type of change is considered critical because it can lead to errors or inconsistencies in data handling, potentially disrupting dependent processes or functionalities.

Low Impact Changes are generally expansions to the existing data graph structure that do not interfere with or alter existing entities or relationships. Adding a new entity or introducing a new relationship that does not impact existing relationships falls into this category. These changes are viewed as enhancements that extend the data graph's capabilities without affecting its current operations.

Property-Level Changes

At the property level, Definite Breaking Changes may involve modifications that could alter the fundamental interactions within the data graph. For example, changes such as editing an entity's slug, deleting an enrichment that is referenced, or modifying a join_key in profiles that could disrupt established linkages and data integrity. Similarly, changes to relationship configurations, like altering a join_on condition, are considered breaking because they can fundamentally change how entities are interconnected, affecting the overall data flow and processing logic.

Warehouse-Level Changes

Warehouse-Level Changes address modifications within the data warehouse that directly impact the data graph's accuracy and functionality. These include changes to the schema or structure of the warehouse, such as renaming tables or altering column data types, which could lead to discrepancies between the warehouse and the data graph. Such changes require careful management to ensure that they do not disrupt the system's ability to accurately reflect and utilize warehouse data.

Potentially Breaking Changes/Other Changes

This category includes modifications that may not immediately disrupt system operations but could potentially lead to issues if not managed correctly. For instance, editing a table reference or a primary key could disrupt data access patterns or integrity if these changes are not properly integrated into the existing data graph structure.

In example embodiments, categorization of changes may be used for maintaining the robustness and reliability of the Data Graph system. By clearly defining the nature of changes—whether breaking, low impact, or potentially breaking—the system can implement appropriate strategies for change management. This ensures that updates not only enhance the system's functionality but also maintain its stability and performance, thereby supporting a dynamic yet dependable data management environment.

In example embodiments, each component of the system may perform one or more functions to integrate seamlessly with other parts of the system and maintaining overall stability and efficiency.

Entities Core Functions

The Entities Core may be responsible for detecting changes in the data graph and alerting other systems or components about these changes. The functions of the Entities Core may include the ability to detect and differentiate between breaking and non-breaking changes, save these changes appropriately, and send alerts to downstream services. Additionally, the Entities Core may display a warning message when a change that could potentially disable certain functionalities (like audiences or mappings) is about to be saved, ensuring that users are aware of the implications of their actions. In example embodiments, this component includes one or more of the warehouse discovery service module and/or the data graph service module.

Linked Audiences Functions

The Linked Audiences component may be a downstream feature of the Data Graph system, specifically designed to manage and utilize audience data effectively. Positioned to operate based on the inputs and changes from the Data Graph, Linked Audiences facilitates the creation, management, and dynamic updating of user groups or entities based on specific criteria derived from the data graph. This capability may be used for executing targeted marketing campaigns, personalizing user experiences, or other strategic initiatives that require segmentation based on shared attributes or behaviors.

Linked Audiences may dynamically update audience segments in response to modifications in the data graph. For example, if user attributes or relationships that define an audience group change, Linked Audiences automatically updates the group to reflect these changes, ensuring that the audience data remains relevant and accurate. This dynamic response is supported by the system's robust change detection mechanisms, which notify the Linked Audiences component of any changes that could impact audience definitions, especially handling critical updates that might invalidate existing segments.

Moreover, Linked Audiences may be equipped with sophisticated error handling and notification systems. When changes potentially disrupt audience validity, the component not only flags these issues but also provides actionable notifications and error messages. This implementation helps system administrators or end-users to make necessary adjustments, such as redefining the audience or updating elements within the data graph to restore consistency.

The user interface of the Linked Audiences component may be designed to be intuitive, allowing even non-technical users, such as marketers or business analysts, to effortlessly create, manage, and monitor audiences. This interface typically includes tools for setting audience criteria, visualizing segments, and assessing the performance or engagement levels of different audiences.

Functions within Linked Audiences for supporting the change detection feature may focus on handling the impact of breaking changes. When a breaking change occurs, the status of affected audiences may be updated to reflect an invalid or error state, and these audiences may be disabled until the issue is resolved. Detailed error messages may be displayed on the audience overview page, explaining the nature of the breaking change and prompting users to edit their audience configurations for remediation. The system may also consolidate warnings if multiple breaking changes are detected, simplifying the management process for users.

Event Emitter Functions

The Event Emitter's functions may be include ensuring that any changes in the data graph that affect event emitters are communicated effectively. If an audience is in an invalid state due to a breaking change, the event emitter associated with that audience may also be disabled. The system may display error messages informing users to update their audience conditions before the event emitter can be re-enabled. Once the audience is updated and valid, users may manually update the event emitter to reflect the changes, ensuring that components are synchronized and functional.

Modifications within the Data Graph system that are considered to have minimal disruptive impact on its overall functionality and stability may be considered low-impact changes. These changes may be categorized into entity & relationship level changes, property-level changes, and warehouse-level changes, each tailored to enhance or extend the system without compromising existing operations or data integrity.

Entity & Relationship-Level Changes

Figure 12A:
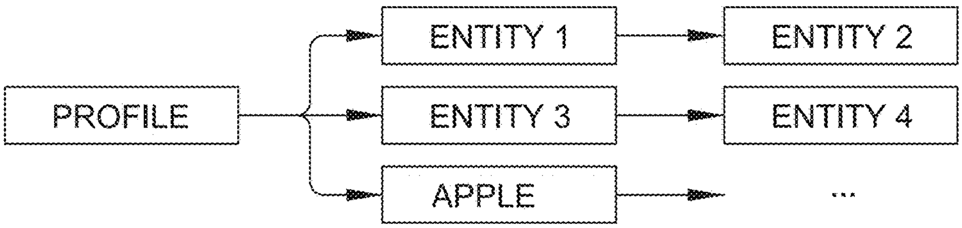
FIG. 12A is a block diagram depicting a new entity and/or relationship branch added to a profile within the data graph.
Figure 12B:
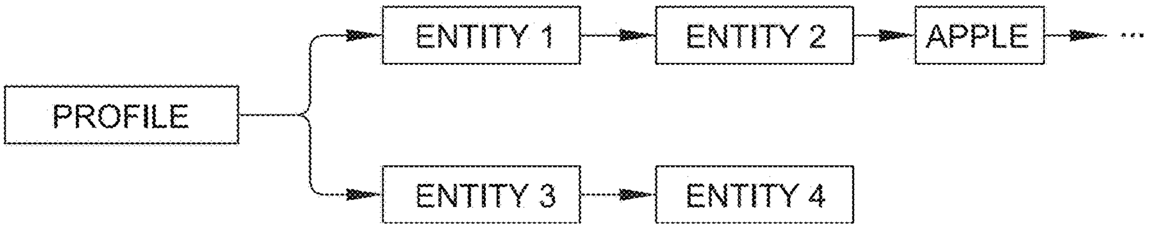
FIG. 12B is a block diagram depicting a new entity and/or relationship added to the end of an existing branch in the data graph, extending the data model at the terminal points of data branches and enhancing the schema while maintaining the integrity of existing data pathways.

At the entity and relationship level, low impact changes include the addition of new entities and relationships that do not interfere with existing structures. For example, introducing a new entity or establishing a new relationship that does not affect existing relationships allows the system to expand its data model and connectivity seamlessly. This is in contrast to definite breaking changes, which might involve deleting or fundamentally altering existing entities or relationships that other parts of the system rely on, potentially leading to errors or inconsistencies. FIG. 12A is a block diagram depicting a new entity and/or relationship branched added to a profile. FIG. 12B is a block diagram depicting a new entity and/or relationship added to the end of a branch. Both of these types of changes may qualify as low-impact changes.

Property-Level Changes

Property-level low impact changes typically involve modifications to the names or attributes of entities or relationships that do not alter their functional roles within the data graph. Changes such as editing an entity name or a relationship name are considered low impact because they update labels or identifiers without affecting the underlying data structure or logic. This differs significantly from definite breaking changes at the property level, which might include changes that alter key attributes or relationships in ways that could disrupt data integrity or linkage, such as changing a primary key or modifying a critical data relationship.

Warehouse-Level Changes

At the warehouse level, low impact changes are those that extend the data warehouse schema to accommodate new structures, such as adding a new entity or relationship branch. These additions enhance the schema without disrupting existing data flows, unlike definite breaking changes that might involve alterations leading to potential data loss or system errors, such as removing a widely used table or field.

Functional Differences in Handling Changes

The various components of the Data Graph system handle low impact changes differently compared to definite breaking changes:

Entities Core: For low impact changes, the Entities Core focuses on accurately detecting and logging these changes without immediate system-wide alerts, as these modifications do not require urgent attention. In contrast, for definite breaking changes, the Entities Core may actively alert and sometimes halt system operations to prevent errors, requiring immediate and often extensive coordination across the system to address potential impacts.

Linked Audiences: This component updates dynamically to reflect low impact changes, ensuring that audience definitions remain relevant without necessitating significant recalculations or disruptions. For definite breaking changes, however, Linked Audiences may disable affected audience segments and require user intervention to redefine or correct audience parameters based on the new data landscape.

Event Emitter: In the context of low impact changes, the Event Emitter sends routine notifications or updates to relevant system components, which typically do not trigger immediate or emergency actions. For definite breaking changes, the Event Emitter plays a critical role in broadcasting urgent updates and coordinating responses across the system to mitigate potential disruptions.

Potentially breaking changes or other changes may include modifications within the Data Graph system that might not immediately disrupt operations but could potentially lead to significant issues if not managed carefully. These changes may be categorized into entity & relationship level changes and property-level changes, each requiring careful consideration to ensure they do not escalate into critical problems.

Entity & Relationship-Level Changes

Figure 12C:
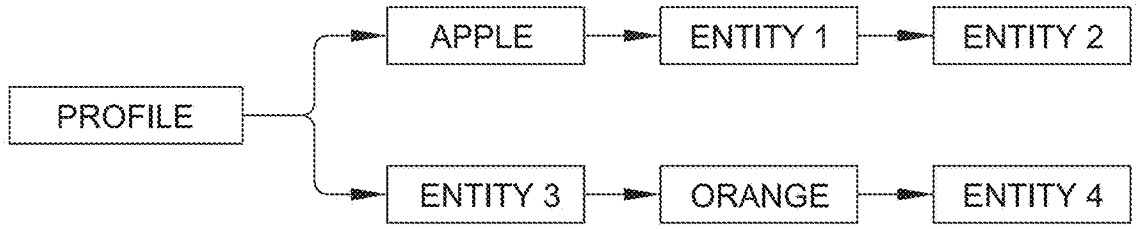
FIG. 12C is a block diagram illustrating the addition of a new relationship to the data graph that changes an existing relationship hierarchy, highlighting a potentially breaking change where the new relationship modifies how entities are interconnected within the data graph.

For entity and relationship level changes, potentially breaking modifications include alterations that might affect the existing structure or functionality of the data graph but whose impact is not immediately clear. For example, editing a table reference or a primary key within the data graph could potentially disrupt data access patterns or integrity if these changes are not properly integrated into the existing data structure. Unlike low impact changes that seamlessly integrate without affecting existing operations, or definite breaking changes that immediately disrupt system functionality, potentially breaking changes occupy a middle ground where the risk is conditional and may depend on various factors such as system configuration or data dependencies. FIG. 12C is a block diagram depicting adding of a new relationship to the data graph that will change an existing relationship hierarchy. This type of change may qualify as a potentially-breaking change.

Property-Level Changes

At the property level, potentially breaking changes might involve modifications to properties that could affect the visibility or usability of data. Changes such as altering data types or adjusting table references need careful handling to ensure they do not lead to larger issues like data type mismatches or broken data links. These changes are more ambiguous in terms of their impact compared to definite breaking changes, which clearly disrupt system operations, and low impact changes, which are generally safe and routine.

Functional Differences in Handling Changes

The handling of potentially breaking changes within the Data Graph system involves a more cautious approach compared to other types of changes:

Entities Core: This component may be configured to implement robust monitoring and validation mechanisms for potentially breaking changes, ensuring that any modifications are compatible with existing data structures and business logic. Unlike with low impact changes, where the focus is on simple logging and tracking, or definite breaking changes that require immediate intervention, potentially breaking changes necessitate a proactive assessment to prevent escalation into more severe issues. In example embodiments, this component includes one or more of the warehouse discovery service module and/or the data graph service module.

Linked Audiences: For potentially breaking changes, Linked Audiences may need to implement conditional checks or temporary safeguards to ensure that audience definitions based on potentially altered data remain valid. This is more complex than handling low impact changes, which do not alter audience definitions, and less drastic than responses to definite breaking changes, which might require completely disabling affected audiences.

Event Emitter: The Event Emitter in the context of potentially breaking changes plays a crucial role in issuing conditional alerts or warnings based on the nature of the change and its assessed impact. This differs from handling low impact changes, which typically involve routine notifications, and from managing definite breaking changes, where the focus is on urgent and widespread alerts to prevent immediate system disruptions.

Figure 13:
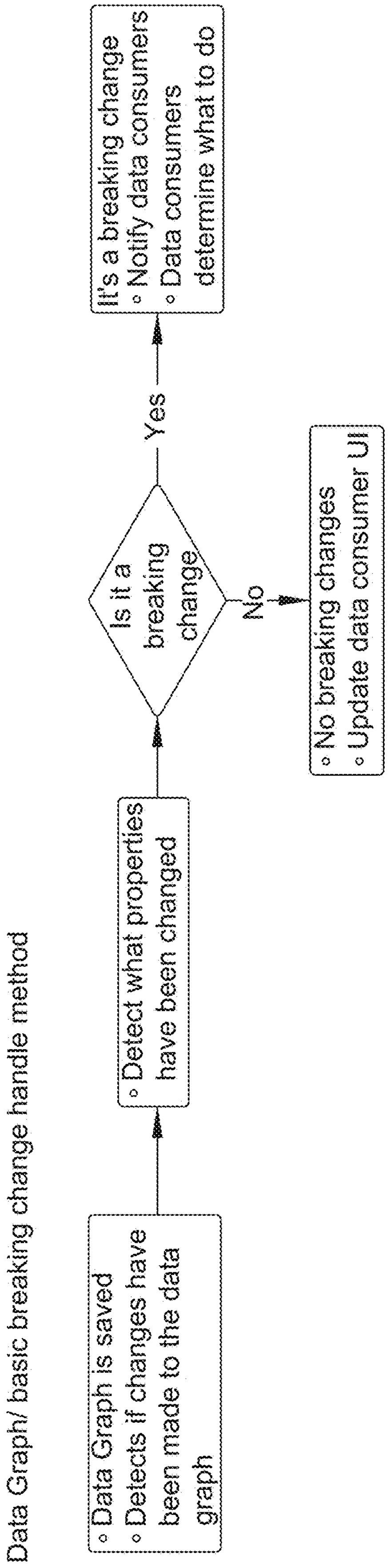
FIG. 13 is a flowchart illustrating an example method for managing data integrity and system stability in response to breaking changes within the data graph.

FIG. 13 is a flowchart depicting an example method for managing data integrity and system stability. It not only provides a roadmap for handling disruptions but also incorporates a feedback loop to continually improve the process. This proactive and structured approach may help with maintaining the reliability of the data graph, ensuring that it can support the dynamic needs of an organization without succumbing to potential disruptions caused by basic breaking changes. This method may enhance both the immediate and long-term resilience of the data management system.

The method may begin with an initial detection of changes within the Data Graph. This starting point may trigger a process of change management. In example embodiments, the system is designed to continuously monitor the data graph for any modifications, and once a change is detected, it is assessed to determine its nature and potential impact.

The process may include a decision node (e.g., after the detection of the changes) asking whether the detected change is a breaking change. A breaking change may refer to modifications that disrupt existing functionalities or necessitate changes in other dependent components. For example, altering a data schema or modifying API parameters in a way that existing systems or client applications cannot handle without an update may constitute a breaking change. These changes may lead to compatibility issues, requiring intervention from developers or system administrators to update or adjust dependent systems and configurations. Such changes are significant enough to warrant a major version increment, signalling the need for careful integration and potential adjustments in operational procedures.

Conversely, non-breaking changes may include enhancements or additions that integrate seamlessly into the existing system without affecting its current operations. These may include adding new optional fields to data models, introducing additional features that do not alter existing functionalities, or making performance optimizations. Because these changes do not disrupt the operation of dependent components or the overall system functionality, they may be implemented without necessitating changes in client applications or other interacting systems. Non-breaking changes may be included in minor or patch releases and may be useful for continuous improvement of the system without causing disruptions to the user experience or existing workflows.

For the purposes of detecting changes in the data graph, managing these types of changes may effectively ensure that enhancements and necessary modifications enhance the system's capabilities without undermining its stability or causing downtime. This careful management of changes may maintain the reliability and efficiency of the system, ensuring that it continues to meet user needs and adapts to new requirements smoothly.

If the change is not breaking, the method may direct to a continuation of normal operations. This path might include minor updates or logs of the change but does not require further significant action. This ensures that non-disruptive changes are processed efficiently without unnecessary interventions, maintaining system fluidity.

If the change is identified as breaking, the method may include a more complex pathway. This may include one or more steps designed to mitigate the impact of the change:

Notification: One of the first actions is to notify relevant stakeholders, such as system administrators, developers, or data managers. This step may help for transparency and ensure that those responsible for maintaining the system are aware of the potential issue and can begin formulating a response.

Mitigation Actions: One or more potential actions to address the breaking change may be implemented. These might include rolling back the change to a previous stable state, applying patches or fixes, or even temporarily disabling certain functionalities to prevent further issues. This step is tailored to the specific nature of the breaking change and the architecture of the data graph.

After addressing the immediate impacts of the breaking change, the feedback and/or optimization may be implemented. This stage may involve:

Collecting Feedback: Gathering insights from the stakeholders involved in the mitigation process. This could include feedback on the effectiveness of the response, any challenges encountered, and/or suggestions for improvement.

Review and Optimize: Using the collected feedback, the system undergoes a review process aimed at enhancing the change management protocol. This might involve adjusting the detection algorithms, refining the notification processes, or improving the tools available for handling breaking changes.

Figure 14:
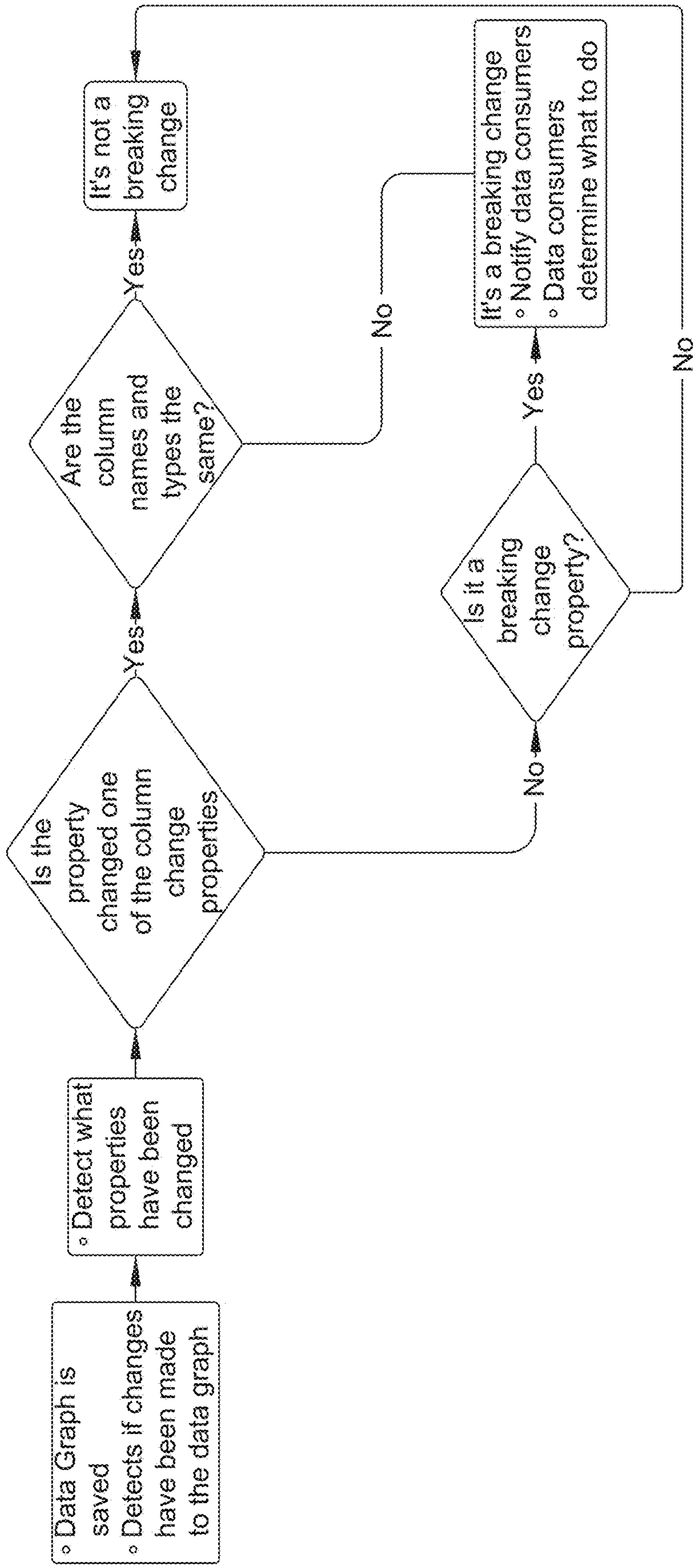
FIG. 14 is a flowchart illustrating an method for handling breaking changes within the data graph.

FIG. 14 is a flowchart that outlines a method for addressing advanced breaking changes within the Data Graph system. This method includes one or more nuanced steps taken when a significant, potentially disruptive change is detected, ensuring a methodical and effective response.

The method may initiate with the detection phase, where the system continuously monitors the Data Graph for any modifications. Upon detecting a change, the system evaluates whether it qualifies as a breaking change (e.g., based on one or more configurable or predefined criteria, such as impact on existing functionalities, dependencies, and potential for causing system errors or data inconsistencies).

If the change is identified as breaking, the method may include a decision-making process that one or more layers of assessment and response:

Immediate Notification: A possible response to confirming a breaking change is to notify relevant personnel. This includes system administrators who might need to intervene manually, and developers who may need to adjust code or configurations. Notifications may also extend to external stakeholders who could be affected by the downtime or data integrity issues.

Impact Analysis and Mitigation: Another possible response includes on or more steps for impact analysis. This includes assessing the extent of the disruption across different modules of the system and identifying which dependencies are compromised. Mitigation strategies are then deployed, which could range from temporary patches and rollbacks to more extensive system overhauls if necessary. Each mitigation action is chosen based on its ability to quickly restore system functionality while minimizing data loss or further complications.

The method may also include a feedback loop for post-mitigation:

Feedback Collection: After the mitigation measures are implemented, feedback may be solicited from one or more affected parties. This feedback assesses the effectiveness of the response and gathers insights on potential improvements.

System Optimization: Utilizing the collected feedback, the system may undergo a thorough review to refine the change management protocols. This might involve enhancing the detection algorithms to more accurately identify breaking changes, improving the communication processes for faster and clearer notifications, or upgrading the tools and technologies used to handle such changes.

One or more steps of this method may be integrated into the system's user interface. This could include configuring how alerts are displayed, how users can interact with the system to understand the impact of the change, and how they can contribute to the remediation process.

In example embodiments, visualization for managing complex breaking changes within the Data Graph system are presented within one or more user interfaces. This ensures that all team members understand the sophisticated processes involved in detecting, assessing, and responding to changes that could potentially disrupt system operations. By following a detailed and structured approach, the system maintains high reliability and continues to function effectively, even in the face of significant changes. This not only provides a practical implementation of immediate response strategies but also supports long-term improvements in system stability and reliability through a feedback and optimization loop.

Figure 15:
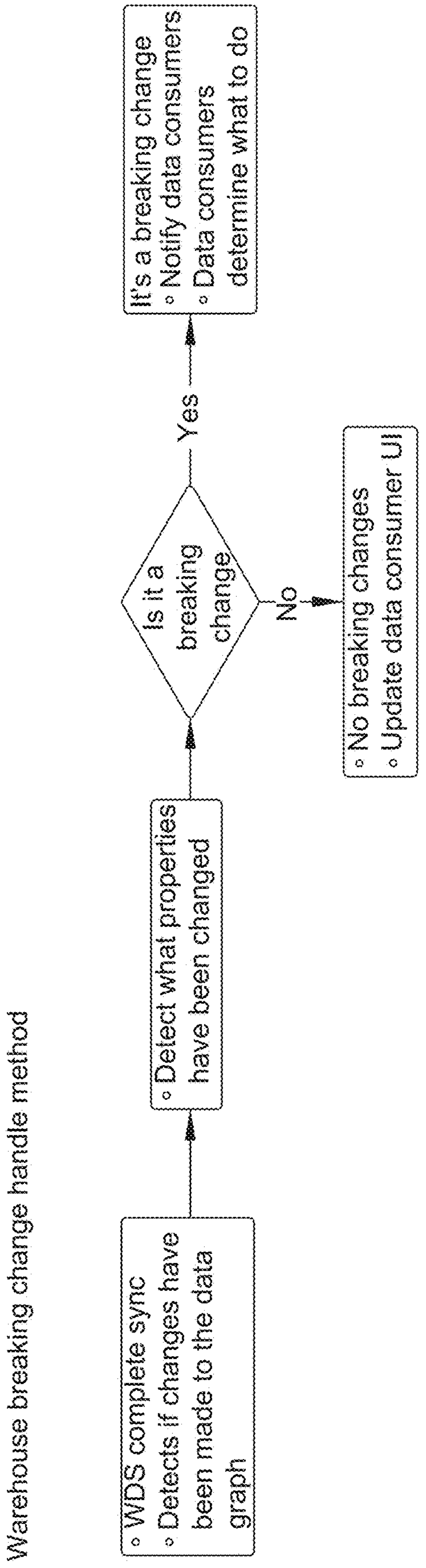
FIG. 15 is a flowchart illustrating an example method for managing breaking changes within a data warehouse component of the data graph system.

FIG. 15 is a flowchart of an example method for managing breaking changes within a data warehouse component of a data graph system. This method includes one or more steps to address significant changes that could potentially disrupt warehouse operations and data integrity.

The method may begin with the Warehouse Discovery Service (WDS) completing a synchronization process. This may help ensure that the data warehouse is up-to-date with the latest data graph configurations. This synchronization step may set the stage for detecting any discrepancies or changes that might affect the warehouse's structure or functionality.

Upon completion of the synchronization, the method may include detecting changes within the data warehouse. This detection may include identifying whether there are any modifications that qualify as breaking changes. These could include alterations to table structures, changes in data types, or modifications to relationships that are critical for the data integrity and operational continuity of the warehouse.

If a breaking change is detected, the method may include a decision-making process:

Assessment of Impact: The system may evaluate whether the detected change will significantly impact the warehouse operations. This assessment may be based on one or more configurable or predefined criteria, such as the extent of data affected, the criticality of the affected data or operations, and/or the potential for causing downstream errors or system failures.

Notification and Mitigation: If the change is confirmed as breaking, the method may include notifying relevant personnel, such as database administrators and system operators, who would need to take immediate action. The mitigation strategies might involve rolling back the changes, applying patches, or modifying other system configurations to accommodate the change and restore normal operations.

The method may include a feedback loop after addressing the breaking change:

Feedback Collection: After implementing the necessary mitigation measures, the system may collect feedback from the involved personnel to evaluate the effectiveness of the response and to gather insights on potential improvements.

Review and Optimization: Leveraging the collected feedback, the system may undergo a review to refine the change management protocols for the warehouse. This might involve enhancing the detection mechanisms to more accurately identify breaking changes in the future, improving the communication processes for faster and clearer notifications, or upgrading the tools and technologies used to handle such changes.

The method may be implemented as a tool for managing breaking changes within the data warehouse component of the Data Graph system. It includes a structured and detailed approach to detecting, assessing, and responding to changes that could potentially disrupt warehouse operations. By following one or more of these steps, the system ensures the continuity and reliability of warehouse operations, maintaining data integrity and operational efficiency even in the face of significant changes. This not only serves as a practical implementation for immediate response strategies but also supports long-term improvements in warehouse stability and reliability through its comprehensive feedback and optimization loop.

In example embodiments, an algorithm is designed to effectively manage changes within a data graph system, ensuring minimal disruption and enhanced data processing efficiency. This algorithm operates by continuously monitoring the data graph, which defines relationships and entities within a data warehouse, for any updates or alterations. Upon detecting changes, the algorithm categorizes them as either breaking or non-breaking based on predefined criteria that assess their potential impact on system stability and data integrity. Following this categorization, the algorithm evaluates the potential impacts of these changes on the data graph's integrity and the existing functionalities of the data warehouse. Based on this evaluation, the algorithm then executes appropriate modifications to the data graph or data warehouse configurations. These modifications are carried out using an algorithm that is specifically optimized to handle these changes efficiently, thereby maintaining or restoring the system's functionality and ensuring the integrity of the data. This process may be automated and managed by one or more specialized modules within the system, highlighting the algorithm's capability to adapt and respond to dynamic changes within the data environment.

Data Collection

One step in developing the optimized algorithm may involve the systematic collection of historical data from the data graph system. This data includes detailed logs of all changes made to the data graph, including the type of change (e.g., addition, deletion, modification), the entities and relationships affected, and the timestamps of these changes. Additionally, system performance metrics and data integrity indicators before and after each change are recorded. This historical data is stored in a secure, structured database that allows for efficient querying and analysis.

Model Training

With a comprehensive dataset in place, a machine learning model may be trained to understand and predict the impacts of various changes on the system. This training involves selecting appropriate machine learning algorithms, such as decision trees, neural networks, or ensemble methods, depending on the complexity and nature of the data. The model is trained using a split of the historical data, with a portion reserved for training and another for validation. Key performance metrics such as accuracy, precision, recall, and/or F1-score may be used to evaluate the model's effectiveness. The training process may be iteratively refined by adjusting parameters and algorithms until the model achieves a satisfactory level of predictive performance.

In example embodiments, AI use cases for data graph may include teaching a large language model the shape of the warehouse data (e.g., via one or more prompts) (e.g., to potentially create generative audiences based on the warehouse data).

In example embodiments, additional AI use cases may include configuration via the data graph of one or more statistical analyses of the customer's warehouse data, such as (1) topK values for columns (e.g., used for autocompletion of audience filtering criteria with actual values from the customer's data set) and/or (2) min-hash sketch utilization (e.g., for understanding the sizes of various combinations of audience criteria and the resulting approximate audience size)

In example embodiments, the training of the machine learning model used in the optimized algorithm for managing changes within the data graph system may be conducted in two phases: initial training and refinement training. This two-step approach may be designed to enhance the model's accuracy and adaptability.

In the initial training phase, the model may be trained on a broad set of historical data collected from the data graph system. This dataset includes a wide variety of change instances and their impacts on system performance and data integrity, encompassing a diverse range of scenarios. The purpose of this phase is to establish a robust baseline understanding of how different types of changes generally affect the system. The model learns to recognize patterns and predict general outcomes using algorithms suitable for handling large, diverse datasets, such as decision trees or basic neural networks. This phase sets the foundation for the more focused training that follows.

Following the initial training, the refinement training phase involves re-training the model on a curated subset of the historical data. This subset is specifically selected to include more complex or critical change instances that are directly relevant to the most pressing operational needs of the data graph system. The refinement phase uses more sophisticated machine learning techniques, such as deep learning or ensemble methods, which can model complex relationships and subtle nuances in the data more effectively. This phase fine-tunes the model's predictions, focusing on improving accuracy and reliability in scenarios that are most likely to impact the system's stability and data integrity.

This two-step training process not only enhances the model's overall performance but also ensures that it is well-adapted to the specific operational context of the data graph system.

In the data graph system, the initial broad training equips the model with the capability to handle a wide range of change scenarios, while the refinement training ensures exceptional performance where it matters most.

Simulation Testing

Once trained, the model may be employed in a series of controlled simulations designed to test the algorithm under various hypothetical scenarios. These simulations mimic potential changes to the data graph and use the model to predict outcomes. The simulation environment replicates the actual data graph system's architecture to ensure that the results are as realistic as possible. The effectiveness of the algorithm in minimizing disruption and enhancing data processing efficiency is assessed by comparing the simulated outcomes with expected results based on historical data. Adjustments are made to address any discrepancies or inefficiencies observed during these tests.

In example embodiments, a one-step training process may be used that involves training the machine learning model in a single phase. This technique is designed to quickly develop a functional model using a comprehensive dataset that includes a balanced mix of all types of changes and their impacts on the system. The one-step training process is particularly advantageous in situations where time constraints or data limitations preclude a more segmented approach.

The one-step training involves using a consolidated dataset that captures a wide array of scenarios reflecting various changes to the data graph and their consequences. This dataset is representative of the operational diversity and challenges faced by the data graph system. The model is trained using advanced machine learning algorithms capable of extracting meaningful patterns and insights from complex and heterogeneous data. Techniques such as gradient boosting machines or sophisticated neural networks may be employed to handle the complexity and variability of the dataset effectively.

Benefits of One-Step Training

Efficiency: The one-step training process is significantly more time-efficient, as it eliminates the need for multiple training phases and the associated overheads of data segmentation and model reconfiguration. This efficiency makes it ideal for rapid model development and deployment.

Simplicity: This approach simplifies the training process, reducing the complexity of the machine learning pipeline. It is easier to manage and requires less specialized knowledge in data handling and model tuning, making it accessible to a broader range of developers and system administrators.

Flexibility: One-step training offers greater flexibility in handling diverse data types and change scenarios within a single model. This flexibility is crucial for systems that experience frequent modifications or where changes are highly unpredictable.

Scalability: Training a model in one step using a comprehensive dataset ensures that the model is immediately scalable and robust. It can handle a variety of situations without the need for continuous adjustments or updates, which is beneficial for large-scale systems or applications where stability is critical.

For the one-step training process, the dataset used is well-curated and representative of the real-world challenges faced by the data graph system. Data preprocessing steps such as normalization, handling of missing values, and feature engineering may be used in enhancing the model's performance. Additionally, validation strategies such as cross-validation may be employed to assess the model's accuracy and generalizability before deployment.

Algorithm Refinement

Based on the insights gained from simulation testing, the algorithm may undergo a refinement process. This involves fine-tuning the algorithm's parameters and incorporating adaptive feedback mechanisms that allow the algorithm to adjust its behavior based on real-time data. For example, if the algorithm detects that certain types of changes consistently lead to performance degradation, it can automatically adjust its processing strategy to mitigate such impacts in future instances. The refinement process is continuous, with ongoing monitoring of the system's performance and periodic updates to the algorithm to adapt to new data or changes in system architecture.

Implementation Considerations

To implement these processes, the system may utilize high-performance computing resources capable of handling large datasets and complex computations. The development environment includes tools for machine learning model development, such as TensorFlow or PyTorch, and simulation software that can model the data graph system's behavior. The system's architecture is designed to support seamless updates and integration of the refined algorithm without disrupting existing operations.

In example embodiments, the optimized algorithm employs a set of criteria to evaluate changes within the data graph, categorizing them based on their potential impact on system stability and data integrity. These criteria are integral to maintaining the system's performance and are designed to be both measurable and directly relevant to the system's operational requirements.

For system stability, the criteria include dependency analysis, which assesses the impact of changes on critical dependencies within the data graph. Changes that affect these dependencies could potentially destabilize the system. Resource utilization is also monitored, evaluating how changes affect CPU, memory, and storage usage. Significant increases in resource demand could indicate potential stability issues. Performance metrics such as query response times, transaction throughput, and system latency are tracked before and after changes to identify any degradation in performance. Additionally, the system monitors the error rate, noting the frequency and severity of errors or exceptions that occur post-change, which could signal stability problems.

Regarding data integrity, the criteria focus on ensuring data completeness, verifying that no critical data elements are lost or omitted following changes. Data accuracy is scrutinized to ensure that transformations or migrations do not introduce errors or discrepancies. Consistency checks confirm that changes do not disrupt established consistency rules, such as referential integrity constraints between entities and relationships. Furthermore, the integrity of audit trails is maintained, ensuring that changes do not obscure historical data tracking, which is crucial for compliance and troubleshooting purposes.

These criteria may be implemented through automated monitoring tools and scripts that continuously assess these factors in real-time, with alerts and reports generated for potential issues. This proactive approach allows for immediate corrective actions, including a rollback mechanism to revert changes that significantly impact stability or integrity. Validation of these criteria involves simulated testing scenarios designed to introduce changes with known impacts, allowing for the evaluation of the system's responses and ensuring the criteria accurately reflect the severity and nature of the impacts. Regular updates to these criteria are considered to adapt to new system configurations or operational challenges, ensuring ongoing robustness and reliability.

To provide a comprehensive understanding of the modifications executed by the optimized algorithm in response to changes detected in the data graph, this supplement to the specification will detail specific examples of such modifications. These examples illustrate how the algorithm proactively manages changes to maintain system stability and data integrity, ensuring the data graph system operates efficiently and effectively.

Overview of Example Modifications Executed by the Optimized Algorithm

The optimized algorithm may be designed to execute specific modifications to the data graph or the data warehouse in response to categorized changes. These modifications may be tailored to address the potential impacts identified by the criteria for system stability and data integrity. The following are examples of such modifications, demonstrating the algorithm's capability to adapt and respond effectively to various scenarios.

Schema Adjustments

When changes that potentially disrupt data integrity are detected, such as alterations to entity relationships or data types, the algorithm may execute schema adjustments. These adjustments include altering table schemas to accommodate new data types or modifying relationship definitions to preserve referential integrity. For instance, if a new data type introduces a risk of data type mismatches, the algorithm adjusts the schema to ensure compatibility across the database.

Schema adjustments may be made proactively to accommodate anticipated changes in data types or relationships. By adjusting the schema in advance of deploying changes, the system avoids runtime errors and data mismatches that could lead to system crashes or slowdowns. These adjustments ensure that the database remains robust and that its structure aligns with the data it needs to store and process, thereby maintaining system stability and data integrity.

Index Reconfiguration

To maintain system performance and stability, especially after changes that affect data retrieval paths, the algorithm may reconfigure indexes. This modification involves creating new indexes or adjusting existing ones to optimize query performance and prevent potential slowdowns caused by the increased complexity or volume of data.

The algorithm may dynamically reconfigure indexes based on the current data access patterns and the anticipated impact of changes. By optimizing indexes, the system can reduce query response times and improve transaction throughput, which are critical for user experience and operational efficiency. This reconfiguration helps in balancing the load on the system, preventing bottlenecks, and ensuring smooth data retrieval processes.

Data Validation Rules Update

In response to changes that affect data accuracy, such as modifications to data validation rules or constraints, the algorithm updates these rules within the system. This ensures that all data entering the system continues to meet the required standards of accuracy and consistency, thereby preventing data corruption.

Updating data validation rules automatically in response to changes in data structures or types may help maintain data quality and consistency. This automation reduces the need for manual checks and corrections, significantly lowering the risk of human error and enhancing the efficiency of data processing. It ensures that all data entering the system meets predefined standards, thus safeguarding against data corruption.

Rollback Mechanisms

For changes classified as breaking, particularly those that could lead to severe disruptions or data loss, the algorithm may execute a rollback to a previous stable state of the data graph. This mechanism is crucial for mitigating the impact of changes that do not perform as expected or that introduce significant errors into the system.

Implementing robust rollback mechanisms may provide a safety net that allows the system to revert to a previous stable state if a change leads to unexpected issues. This capability is crucial for minimizing disruption, as it allows the system to maintain service continuity even when facing adverse modifications. It also provides the confidence to experiment with changes, knowing that they can be undone if necessary.

Automated Data Correction

When minor discrepancies or inconsistencies are detected following changes, the algorithm may perform automated data correction. This involves scripts or routines that clean, modify, or update data entries to align with the new configurations of the data graph, ensuring data integrity is maintained without manual intervention.

Automated data correction routines may be triggered when discrepancies are detected, allowing for immediate rectification of data errors. This process not only minimizes the disruption caused by data inaccuracies but also enhances the efficiency of the system by reducing the overhead associated with manual data correction efforts.

Real-Time Synchronization

To ensure that all components of the data graph system reflect the most current and accurate data configuration, the algorithm executes real-time synchronization processes. This modification is particularly important in distributed systems where data consistency across different nodes or databases must be maintained.

Executing real-time synchronization may ensure that all components of the distributed system are consistently updated with the latest data graph configurations. This synchronization prevents data inconsistencies and conflicts that could arise from having different parts of the system operating with outdated information. It enhances the efficiency of data processing by ensuring that all system components work cohesively and are aligned with the current operational requirements.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising: one or more computer processors; one or more computer memories; a network interface; and a set of instructions stored in the one or more computer memories, the set of instructions configuring the one or more computer processors to perform operations comprising: receiving, via the network interface, a data graph specification defining a plurality of data entities and relationships between the data entities, each data entity referencing a corresponding table in a data warehouse, and each relationship specifying how the data entities are interconnected through the data warehouse; generating, by the one or more computer processors, from the data graph specification, an object representation of a data graph, and storing the object representation in the one or more computer memories; validating, by the one or more computer processors, the data warehouse against the object representation of the data graph, including verifying that elements of the data warehouse referenced by the data graph are present in the data warehouse; after the validating, continuously monitoring, by the one or more computer processors, the data warehouse for one or more structural changes that cause the data warehouse to diverge from the stored object representation of the data graph, the one or more structural changes comprising modifications to data structures or entity relationships in the data warehouse; upon detection of a structural change, categorizing, by the one or more computer processors, the structural change as breaking or non-breaking by evaluating whether the structural change affects an element of the data warehouse that is referenced by the object representation of the data graph, wherein a structural change is categorized as breaking when the structural change alters an element of the data warehouse on which the data graph, or a downstream consumer of the data graph, depends; and in response to categorizing the structural change as breaking, generating, by an event emitter executed by the one or more computer processors, one or more event messages identifying the structural change and one or more affected data entities, the one or more event messages being generated using a machine-learning model trained on historical data regarding one or more previous structural changes to the data warehouse and impacts of the one or more previous structural changes, the machine-learning model being trained to identify patterns or predict outcomes associated with different types of structural changes, and propagating, via the network interface, the one or more event messages to one or more downstream system components that depend on the data graph, the one or more downstream system components executing responsive modifications to maintain synchronization between the data graph and the data warehouse.

2. The system of claim 1, wherein the categorizing includes an evaluation of an extent to which the one or changes impact a fundamental data structure of the data graph is altered.

3. The system of claim 1, wherein the categorizing includes an evaluation of an extent to which the one or more changes impact relationships between entities or primary keys used in database indexing.

4. The system of claim 1, wherein the categorizing includes assessing an extent to which the one or more changes affect an accuracy, completeness, or reliability measure pertaining to data stored in the data warehouse.

5. The system of claim 1, wherein the categorizing includes assessing an extent to which the one or more changes introduce a type mismatch, remove data validations, or alter data retrieval paths.

6. The system of claim 1, the operations further comprising creating the optimized algorithm based on a collecting of historical data regarding one or more previous changes to the data graph and impacts of the one or more previous changes on system performance.

7. A method comprising: receiving, via a network interface, a data graph specification defining a plurality of data entities and relationships between the data entities, each data entity referencing a corresponding table in a data warehouse, and each relationship specifying how the data entities are interconnected through the data warehouse; generating, by one or more computer processors, from the data graph specification, an object representation of a data graph, and storing the object representation in one or more computer memories; validating, by the one or more computer processors, the data warehouse against the object representation of the data graph, including verifying that elements of the data warehouse referenced by the data graph are present in the data warehouse; after the validating, continuously monitoring, by the one or more computer processors, the data warehouse for one or more structural changes that cause the data warehouse to diverge from the stored object representation of the data graph, the one or more structural changes comprising modifications to data structures or entity relationships in the data warehouse; upon detection of a structural change, categorizing, by the one or more computer processors, the structural change as breaking or non-breaking by evaluating whether the structural change affects an element of the data warehouse that is referenced by the object representation of the data graph, wherein a structural change is categorized as breaking when the structural change alters an element of the data warehouse on which the data graph, or a downstream consumer of the data graph, depends; and in response to categorizing the structural change as breaking, generating, by an event emitter executed by the one or more computer processors, one or more event messages identifying the structural change and one or more affected data entities, the one or more event messages being generated using a machine-learning model trained on historical data regarding one or more previous structural changes to the data warehouse and impacts of the one or more previous structural changes, the machine-learning model being trained to identify patterns or predict outcomes associated with different types of structural changes, and propagating, via the network interface, the one or more event messages to one or more downstream system components that depend on the data graph, the one or more downstream system components executing responsive modifications to maintain synchronization between the data graph and the data warehouse.

8. The method of claim 7, wherein the categorizing includes an evaluation of an extent to which the one or changes impact a fundamental data structure of the data graph is altered.

9. The method of claim 7, wherein the categorizing includes an evaluation of an extent to which the one or more changes impact relationships between entities or primary keys used in database indexing.

10. The method of claim 7, wherein the categorizing includes assessing an extent to which the one or more changes affect an accuracy, completeness, or reliability measure pertaining to data stored in the data warehouse.

11. The method of claim 7, wherein the categorizing includes assessing an extent to which the one or more changes introduce a type mismatch, remove data validations, or alter data retrieval paths.

12. The method of claim 7, further comprising creating the optimized algorithm based on a collecting of historical data regarding one or more previous changes to the data graph and impacts of the one or more previous changes on system performance.

13. A non-transitory computer-readable storage medium storing a set of instructions that, when executed by one or more computer processors, cause the one or more computer processors to perform operations comprising: receiving, via a network interface, a data graph specification defining a plurality of data entities and relationships between the data entities, each data entity referencing a corresponding table in a data warehouse, and each relationship specifying how the data entities are interconnected through the data warehouse; generating, from the data graph specification, an object representation of a data graph, and storing the object representation in one or more computer memories; validating the data warehouse against the object representation of the data graph, including verifying that elements of the data warehouse referenced by the data graph are present in the data warehouse; after the validating, continuously monitoring the data warehouse for one or more structural changes that cause the data warehouse to diverge from the stored object representation of the data graph, the one or more structural changes comprising modifications to data structures or entity relationships in the data warehouse; upon detection of a structural change, categorizing the structural change as breaking or non-breaking by evaluating whether the structural change affects an element of the data warehouse that is referenced by the object representation of the data graph, wherein a structural change is categorized as breaking when the structural change alters an element of the data warehouse on which the data graph, or a downstream consumer of the data graph, depends; and in response to categorizing the structural change as breaking, generating, by an event emitter, one or more event messages identifying the structural change and one or more affected data entities, the one or more event messages being generated using a machine-learning model trained on historical data regarding one or more previous structural changes to the data warehouse and impacts of the one or more previous structural changes, the machine-learning-model being trained to identify patterns or predict outcomes associated with different types of structural changes, and propagating, via the network interface, the one or more event messages to one or more downstream system components that depend on the data graph, the one or more downstream system components executing responsive modifications to maintain synchronization between the data graph and the data warehouse.

14. The non-transitory computer-readable storage medium of claim 13, wherein the categorizing includes an evaluation of an extent to which the one or changes impact a fundamental data structure of the data graph is altered.

15. The non-transitory computer-readable storage medium of claim 13, wherein the categorizing includes an evaluation of an extent to which the one or more changes impact relationships between entities or primary keys used in database indexing.

16. The non-transitory computer-readable storage medium of claim 13, wherein the categorizing includes assessing an extent to which the one or more changes affect an accuracy, completeness, or reliability measure pertaining to data stored in the data warehouse.

17. The non-transitory computer-readable storage medium of claim 13, wherein the categorizing includes assessing an extent to which the one or more changes introduce a type mismatch, remove data validations, or alter data retrieval paths.

18. The non-transitory computer-readable storage medium of claim 13, the operations further comprising creating the optimized algorithm based on a collecting of historical data regarding one or more previous changes to the data graph and impacts of the one or more previous changes on system performance.

* * * * *